United States Patent
Juncker et al.

(10) Patent No.: US 7,218,934 B2
(45) Date of Patent: May 15, 2007

(54) MOBILE STATION SPEED ESTIMATION

(75) Inventors: Carsten Juncker, Lyngby (DK); Peter Toft, Greve (DK); Niels Jacob Sand Morch, Frederiksberg (DK)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 10/639,531

(22) Filed: Aug. 13, 2003

(65) Prior Publication Data

US 2004/0097197 A1 May 20, 2004

Related U.S. Application Data

(63) Continuation-in-part of application No. 10/073,909, filed on Feb. 14, 2002.

(51) Int. Cl.
*H04Q 7/20* (2006.01)

(52) U.S. Cl. .................... 455/441; 455/422.1; 455/436
(58) Field of Classification Search ............... 445/441, 445/422.1, 436, 455, 504, 505, 67.16
See application file for complete search history.

(56) References Cited

U.S. PATENT DOCUMENTS 3,713,154 A * 1/1973 Kummer ..................... 342/107
6,542,745 B1 * 4/2003 Mottier et al. .............. 455/441

* cited by examiner

*Primary Examiner*—Matthew Anderson
*Assistant Examiner*—Sanh Phu
(74) *Attorney, Agent, or Firm*—Alston & Bird LLP

(57) ABSTRACT

The Doppler spreads of the received signals in a MIMO, SIMO or MISO mobile communication system are estimated from the derivatives of the path transfer function envelopes for the received signals. The estimated Doppler spreads is used to estimate the speed of the mobile station.

48 Claims, 15 Drawing Sheets

MOBILE STATION SPEED ESTIMATION

This is a continuation-in-part application of application Ser. No. 10/073,909, filed Feb. 14, 2002.

FIELD OF THE INVENTION

The present invention relates to the estimation of mobile stations speed using Doppler spread estimation.

BACKGROUND TO THE INVENTION

A radio signal from a transmitter to a receiver will travel along different propagation paths as the signal is scattered by obstacles, such as houses and other objects. This leads to signals received with different time delays, so called multipath propagation. When the receiver starts moving Doppler shifts will be introduced. When several paths arrive at the same time delay a Doppler spread, or Doppler spectrum, is generated.

Knowledge of the Doppler spread has been found to be useful for enhancing the operation of receivers as described, for example, in Morelli, M. et al., "Further Results in Carrier Frequency Estimation for Transmissions Over Flat Fading Channels", IEEE Communications Letters vol. 2, no. 12, December 1998. The Doppler spread can also be used to infer the scalar speed of a receiver relative to local radio reflectors. This scalar speed is not the radial velocity that one can determine by measuring a Doppler shift. In most cases, the speed will correspond to the speed of the receiver, such as in the case of a receiver in a moving car surrounded by stationary street furniture.

SUMMARY OF THE INVENTION

The present inventors have established that the Doppler spread associated with a transmission path can be estimated reliably from the derivative of the transmission path's transfer function.

According to the present invention, there is provided a method of estimating the speed of a mobile station in a MIMO, SIMO or MISO wireless communication system, the method comprising:
  receiving a plurality of radio signals;
  deriving a value for the derivative of the envelope of the path transfer function for each radio signal;
  computing an estimate of the Doppler spread of each of said radio signals from said derivative values; and
  deriving a value for the speed of said mobile station from said Doppler spread estimates.

The radio signals may all be on the same carrier frequency, for instance where MIMO, SIMO or MISO techniques are employed to improve spectrum utilisation efficiency. The separation of signals on different carriers can be achieved by simply filtering the received signals.

The transfer function of a path from a transmitter to a moving receiver is subject to three amplitude effects, namely path loss, slow fading and fast fading. It is the fast fading which is associated with Doppler spread. The fast fading operates at time scales many orders of magnitude smaller than path loss and slow fading. Accordingly, for a signal transmitted at a constant or slowly varying power, the derivative of the envelope of the received signal will be determined predominantly by the fast fading, i.e. Doppler spread, and the path loss and slow fading effects can be disregarded. Modulation effects can be compensated for by demodulating the received signal with a signal corresponding to the modulating signal which can be predetermined, for example by means of reference codes transmitted at predetermined times.

However, the path transfer function can be estimated by techniques, other than by demodulating the received signal with the modulating signal, such as that described in Wu, J. et al., "Blind Channel Estimation Based on Subspace for Multicarrier CDMA", Vehicular Technology Conference, 2001. VTC 2001 Spring. IEEE VTS 53rd, Volume: 4, 2001.

In the minimal case of an unmodulated carrier, the received signal's envelope will be proportional to the transfer function of the path.

Preferably, therefore, said values for the derivatives of said envelopes are derived by low-pass filtering an envelope signal representing the corresponding path transfer function envelope to band limit it and filtering the band-limited envelope signal using an IIR or FIR filter. More preferably, said envelope signals comprise respective sequences of samples representing the corresponding path transfer function envelope.

Preferably, the computing of said estimates of the Doppler spreads comprises determining the variances of said derivative values. More preferably, the computing of said estimates of the Doppler spreads comprises determining a value indicative of the received powers of said radio signals. Still more preferably, the Doppler spread estimates are each calculated by determining the square root of the result of dividing twice the corresponding variance by the value indicative of the received power of the respective radio signal.

Preferably, the Doppler spread estimates are each calculated in accordance with the formula:

$$\text{Doppler spread} \propto \sqrt{\frac{2\hat{b}_2}{\hat{b}_0}}$$

where $$\hat{b}_2 = \frac{1}{N}\sum_{n=1}^{N}\hat{r}_{nT}^2 - \left(\frac{1}{N}\sum_{n=1}^{N}\hat{r}_{nT}\right)^2$$

and $$\hat{b}_0 = \frac{1}{2N}\sum_{n=1}^{N}r_{nT}^2$$

where r is the magnitude of the corresponding radio signal.

The speed of the mobile station may calculated in accordance with the formula:

$$\text{speed} \propto \frac{f_{d_{spread}}}{f_c}$$

where $f_{d_{spread}}$ is the Doppler spread of the signal having the greatest energy during calculation of said derivatives and $f_c$ is the carrier frequency of said radio signal.

Alternatively, the speed of the mobile station may be calculated as the mean, a linearly or non-linearly weighted mean or the median of speeds calculated for a plurality of said signals in accordance with the formula:

$$\text{speed} \propto \frac{f_{d_{spread}}}{f_c}$$

where $f_{d_{spread}}$ is the Doppler spread of a signal and $f_c$ is the carrier frequency of said signal.

The speed estimation method may perform processing applicable to different speed ranges, e.g a low speed range and a high speed range, in parallel and then select the more appropriate speed value as the final speed estimate.

According to the present invention, there are also provided mobile stations including processing means configured, e.g. by software, for performing methods according to the present invention.

DETAILED DESCRIPTION OF THE PREFERRED EMBODIMENTS

Preferred embodiments of the present invention will now be described, by way of example, with reference to the accompanying drawings.

Figure 1:
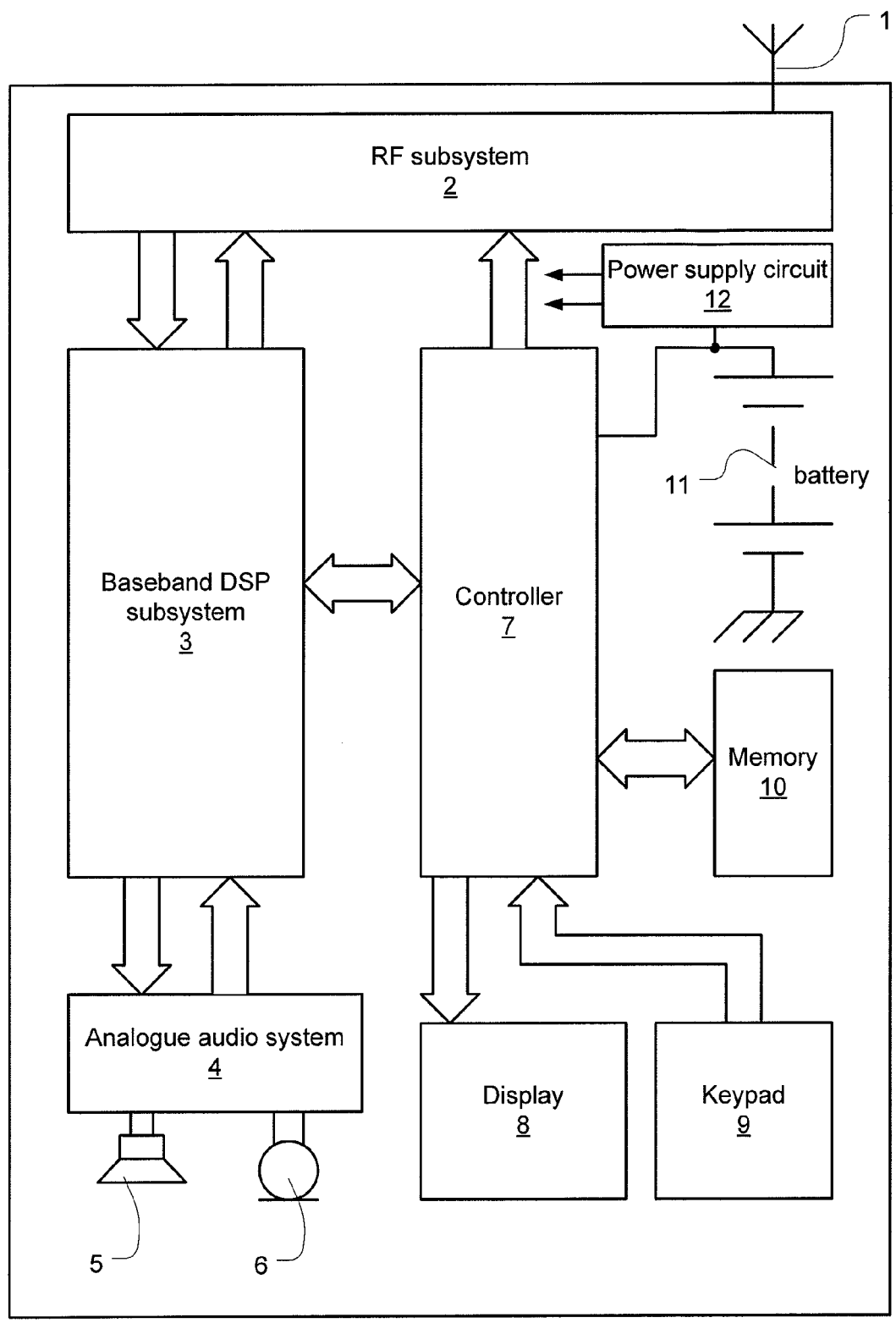
FIG. 1 is a block diagram of a mobile station.

Referring to FIG. 1, a WCDMA mobile station comprises an antenna 1, an rf subsystem 2, a baseband DSP (digital signal processor) subsystem 3, an analogue audio subsystem 4, a loudspeaker 5, a microphone 6, a controller 7, a liquid crystal display 8, a keypad 9, memory 10, a battery 11 and a power supply circuit 12.

The rf subsystem 2 contains if and rf circuits of the mobile telephone's transmitter and receiver and a frequency synthesizer for tuning the mobile station's transmitter and receiver. The antenna 1 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband DSP subsystems 3 includes codec and RAKE functionality, which are well-known in the art, and is programmed for estimating a received signal Doppler spread and the speed of the mobile station.

The analogue audio subsystem 4 is coupled to the baseband DSP subsystem 3 and receives demodulated audio therefrom. The analogue audio subsystem 4 amplifies the demodulated audio and applies it to the loudspeaker 5. Acoustic signals, detected by the microphone 6, are preamplified by the analogue audio subsystem 4 and sent to the baseband DSP subsystem 3 for coding.

The controller 7 controls the operation of the mobile telephone. It is coupled to the rf subsystem 2 for supplying tuning instructions to the frequency synthesizer and to the baseband DSP subsystem 3 for supplying control data and management data for transmission. The controller 7 operates according to a program stored in the memory 10. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The battery 1 is connected to the power supply circuit 12 which provides regulated power at the various voltages used by the components of the mobile telephone.

The controller 7 is programmed to control the mobile station for speech and data communication and with application programs, e.g. a WAP browser, which make use of the mobile station's data communication capabilities.

In order to estimate the speed of the mobile station, the DSP subsystem 3 is programmed to perform calculations appropriate for low and high speeds in parallel and then select the appropriate result.

Figure 2:
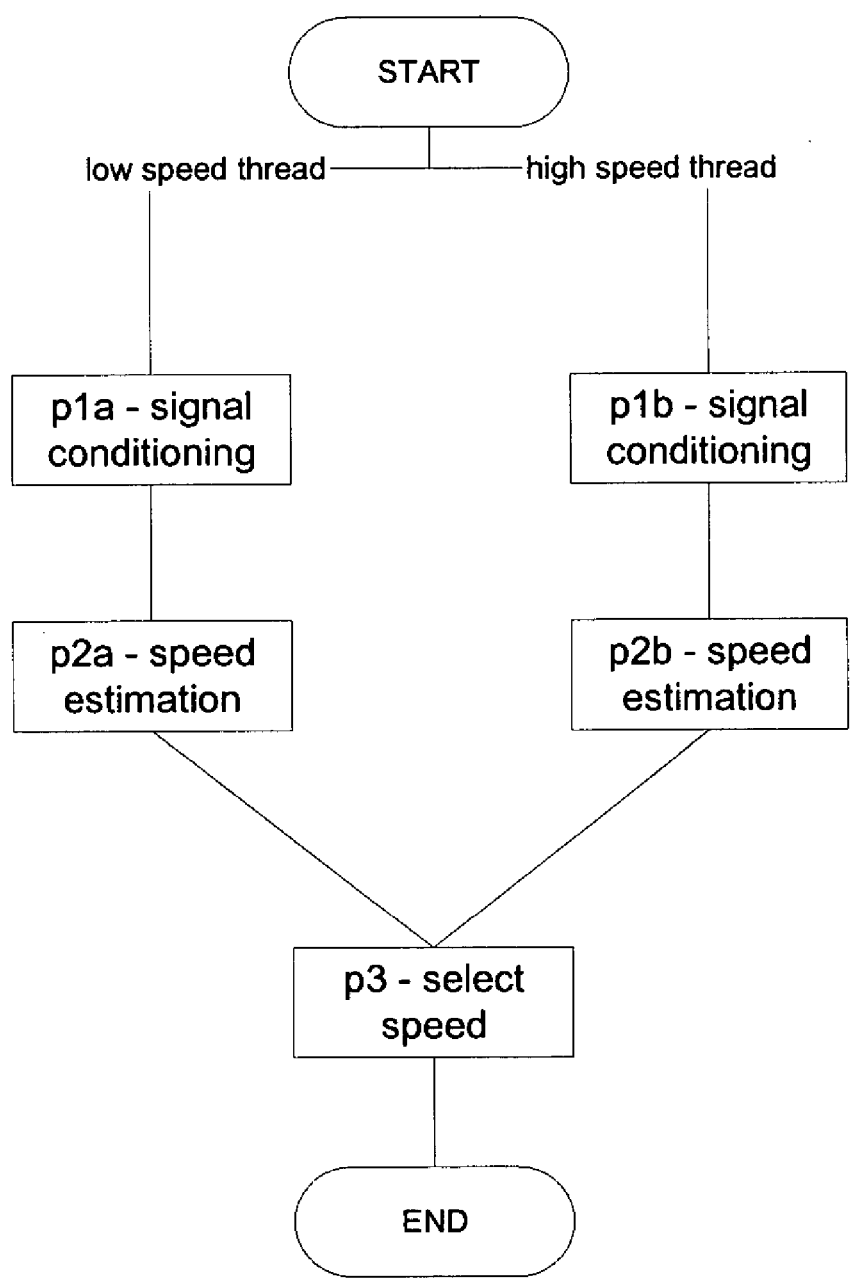
FIG. 2 is a flowchart illustrating a first speed estimating program according to the present invention.

Referring to FIG. 2, the speed estimation program of the DSP subsystem 3 receives a stream of in-phase and quadrature baseband signal components and provides time-domain samples of the transfer function (H) of the signal paths having the various delays handled by the RAKE processing. In the present example, these transfer function samples are obtained by demodulating the received signal for reference symbols with values representing the transmitted signal.

Signal conditioning is performed on the transfer function samples (step p1a and p1b) using algorithms adapted for low and high speed ranges respectively. The low and high speed ranges overlap in the present example. However, the upper edge of the lower range may simply meet the lower edge of the upper range. The conditioned signals are then used to produce speed estimates (steps p2a and p2b) and the appropriate speed estimate is selected (step p3).

The signal conditioning processes p1a, p1b loop through the RAKE fingers which process transfer function signals for respective different path delays. Of course, if the mobile station does not employ a RAKE system, such as where the mobile station is not a CDMA device, there will be no need for this loop.

Figure 3:
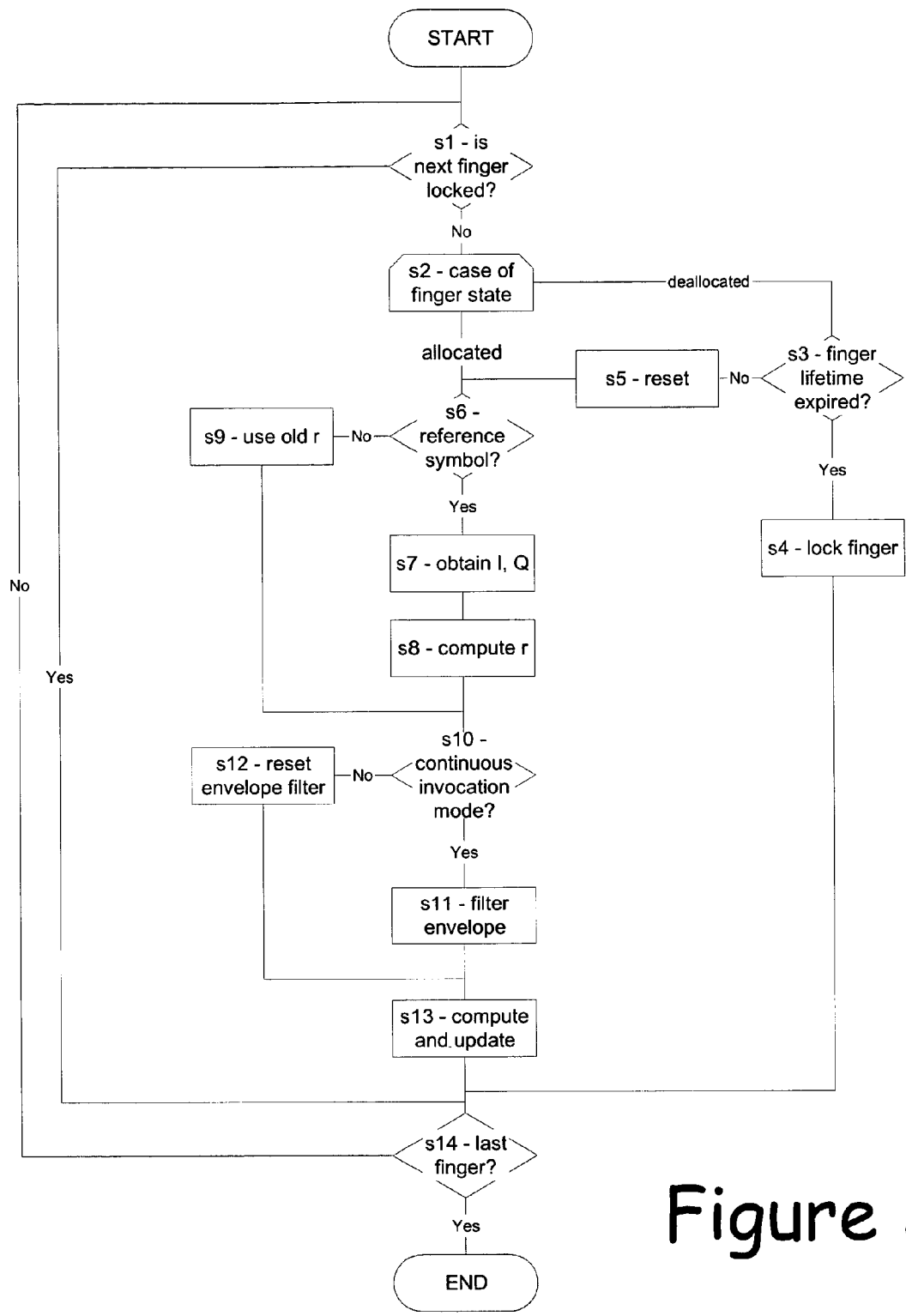
FIG. 3 is a flowchart illustrating a signal conditioning process of the program of FIG. 2.

Referring to FIG. 3, in the low speed signal conditioning estimation process p1a, it is first determined whether the RAKE finger to be processed is locked (step s1). A "locked" finger is one whose allocated lifetime has expired. If the finger is locked at step s1, processing for the current finger is skipped.

However, if the current finger is not locked at step s1, the state of the finger, i.e. deallocated or allocated to a radio path, is determined (step s2).

In the case of the current finger being in the deallocated state at step s2, it is determined whether the finger's lifetime has expired (step s3). If the finger's lifetime has expired at step s3, the finger is locked (step s4) and further processing for it is skipped. However, if the finger's lifetime has not expired at step s3, all variables and parameters for the current finger are reset (step s5).

In the case of the current finger being allocated at step s2 and following step s5, it is determined whether a valid reference symbol has been detected (step s6). The reference symbols occur regularly in signals transmitted to the mobile station and have known and values. Therefore, values associated with like signals are used for calculation of the Doppler spread and speed. In the present case, the power at which the reference signals are transmitted is constant. However, if the power at which they are transmitted varies sufficiently quickly to affect the determined derivative value for the envelope, the magnitude of the envelope can be normalised using information about their transmission power. This information may be provided in control channels, for example.

If a valid reference symbol has been detected, in-phase (I) and quadrature (Q) component values for the transfer function are obtained (step s7). When the aforementioned I and Q values have been obtained, they are used to calculated the magnitude of the transfer function's envelope (r) (step s8).

However, if a valid reference symbol has not been detected, the previous value of transfer function's envelope magnitude is used to avoid gaps in the sequence of envelope magnitude values (step s9).

When the envelope magnitude value has been obtained, it is determined whether continuous invocation mode is being used (step s10). Continuous invocation mode is the normal mode of operation with an envelope value be obtained for each slot, i.e. regularly and frequently. However, under some circumstances, the speed estimation program may not be run in some slots. For instance the program may not be called during the transmission gap in compressed mode.

If operation is continuous, the new envelope magnitude value is fed into a low-pass filtering process (step s11). The low-pass filtering is provided by implementing a $3^{rd}$ order Butterworth IIR filter with a cutoff at 500 Hz. The filtering process for the low speed thread also performs downsampling by a factor of 2. The bandwidth of the filter is set to twice the maximum Doppler shift that can occur in the speed range covered. Thus, 500 Hz corresponds approximately to a speed of 125 km/h at 2.17 GHz.

If the operation is discontinuous, the filtering process s11 is skipped and the output of the filtering process s11 is replaced with the current envelope magnitude value (step s12).

The result of the filtering process s11 or the current envelope magnitude, as the case may be, is used to calculate the square of the envelope magnitude ($r_t^2$), the derivative of the envelope magnitude ($\dot{r}_t$) and the square of the derivative of the envelope magnitude ($\dot{r}_t^2$). Since, the envelope magnitudes are time-spaced samples, the derivative is approximated in the low speed thread using:

$$\hat{\dot{r}}_t = \frac{r_t - r_{t-\Delta T}}{\Delta T}$$

where $\hat{\ }$ indicates an approximate or estimated value and $\Delta T$ is the sampling interval. It can be seen that this is a two-tap FIR filter.

These values are used to update accumulated values $$\sum_{n=1}^{N} r_{nT}^2, \sum_{n=1}^{N} \hat{\dot{r}}_{nT}, \sum_{n=1}^{N} \hat{\dot{r}}_{nT}^2$$

for the square of the envelope magnitude, the approximate derivative of the envelope magnitude and the square of the derivative of the envelope magnitude, where N is an observation window length in terms of sample (step s13). In the present example, N is 750.

If all of the fingers have been processed at step s14, the signal conditioning is complete. Otherwise, the process returns to step s1.

The high speed signal conditioning p1b is the same as the low speed signal conditioning except that the low-pass filter has a cut-off at 1 kHz rather than 500 kHz and the envelope magnitude derivative $\dot{r}_t$ is approximated using:

$$\hat{\dot{r}}_t = \frac{r_t - r_{t-2\Delta T}}{2\Delta T}$$

which is a 3-tap FIR filter having a zero coefficient for the middle tap.

The bandwidth of the filter is set to twice the maximum Doppler shift that can occur in the speed range covered. Thus, 1 kHz corresponds approximately to a speed of 250 km/h at 2.17 GHz.

The results of the low speed and high speed signal conditioning process p1a, p1b are supplied to the low speed and high speed speed estimating processes p2a, p2b respectively.

Figure 4:
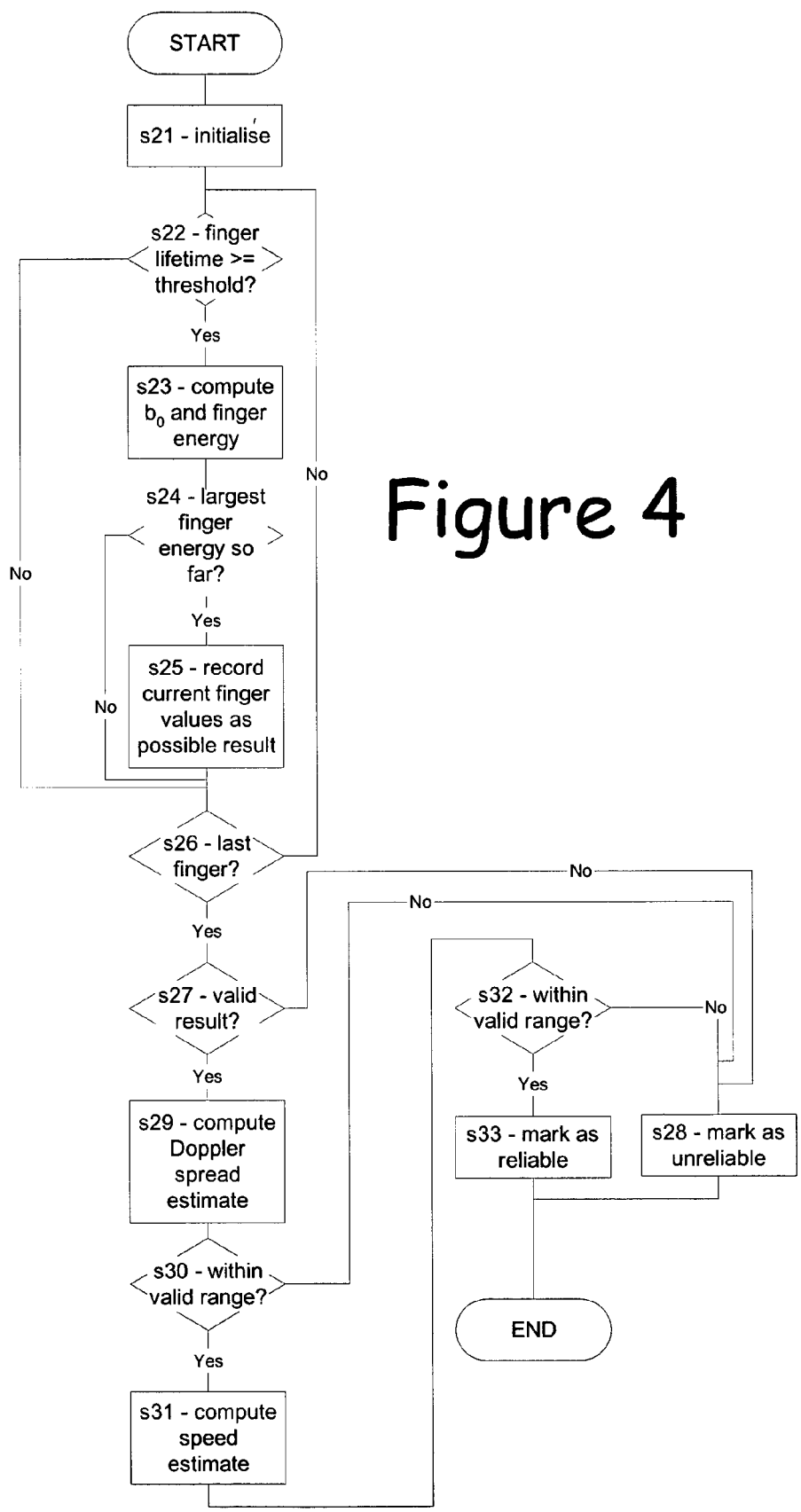
FIG. 4 is a flowchart illustrating a speed estimating process of the program of FIG. 2.

Referring to FIG. 4, at the start of the low speed speed estimating process p2a, an initialisation routine (step s21) sets a "finger valid flag" to true and a "maximum energy" variable to −1. After initialisation, the process enters a loop so that all of the RAKE fingers are processed in turn.

At the start of the loop, it is determined whether the current finger's lifetime is greater than or equal to a threshold (step s2). The threshold is set to identify fingers what are sufficiently old to provide sufficiently good data for reliable speed estimation. If the current finger's lifetime is less than the threshold, the process moves on to the next finger.

If at step s22, the current finger is sufficiently mature, a value $\hat{b}_0$ and an energy related value for the current finger are calculated (step s23). $\hat{b}_0$ is indicative of the power of the current finger and is calculated using:

$$\hat{b}_0 = \frac{1}{2} E\{r^2\}$$

where $E\{r^2\}$ is the mean of $$\sum_{n=1}^{N} r_{nT}^2$$

calculated at step s11 in FIG. 3.

The energy related value for the current finger is calculated by multiplying $\hat{b}_0$ by the current finger's age.

Following step s23, it is determined whether the current finger has the largest energy related value of the fingers processed so far (step s24) by comparing its energy with the "maximum energy" variable. If this is not the case, the process moves on to the next finger. However, if this is the case, the "finger valid flag" is set to true to indicate that data is now available for speed estimation, the "maximum energy" variable is set to the energy of the current finger and an index, identifying the current finger, is stored (step s25).

When all of the fingers have been processed (step s26), it is determined whether data suitable for speed estimation has been obtained by checking the state of the "finger valid flag" (step s27). If the "finger valid flag" is false, no further calculations are performed and the result of the low speed speed estimating process p2a is noted as being unreliable by setting a reliability flag to false. However, if the "finger valid flag" is true, the Doppler spread $\hat{f}_{d_{spread}}$ is estimated for the last finger whose index was stored at step s25 using:

$$\hat{f}_{d_{spread}} = \frac{1}{2\pi}\sqrt{\frac{2\hat{b}_2}{\hat{b}_0}}$$

where $$\hat{b}_2 = E\{\hat{r}^2\} - (E\{\hat{r}\})^2$$

where $E\{\hat{r}^2\}$ is the mean of $$\sum_{n=1}^{N} \hat{r}_{nT}^2$$

calculated at step s11 of FIG. 3 and $E\{\hat{r}\}$ is the mean of $$\sum_{n=1}^{N} \hat{r}_{nT}$$

calculated at step s11 of FIG. 3 (step s29).

The newly calculated Doppler spread estimate is checked to determine whether it falls within a range of valid values (step s30). If the Doppler spread estimate is outside the valid values range, the process proceeds to step s28. However, if it is within the valid values range, it is used to computer a speed estimate for the mobile station using:

$$\hat{v} = \frac{\hat{f}_{d_{spread}} c}{f_c}$$

where c is the velocity of light in free space and $f_c$ is the carrier frequency of the signal being received. It is determined whether the newly estimated speed value is within a valid range, i.e. below 500 km/h in the present example. (step s32). If not, the process moves to step s28. If the speed value is valid, the reliability flag is set to true.

The high speed speed estimating process p2b is identical except for the valid value ranges used at steps s30 and s32.

Figure 5:
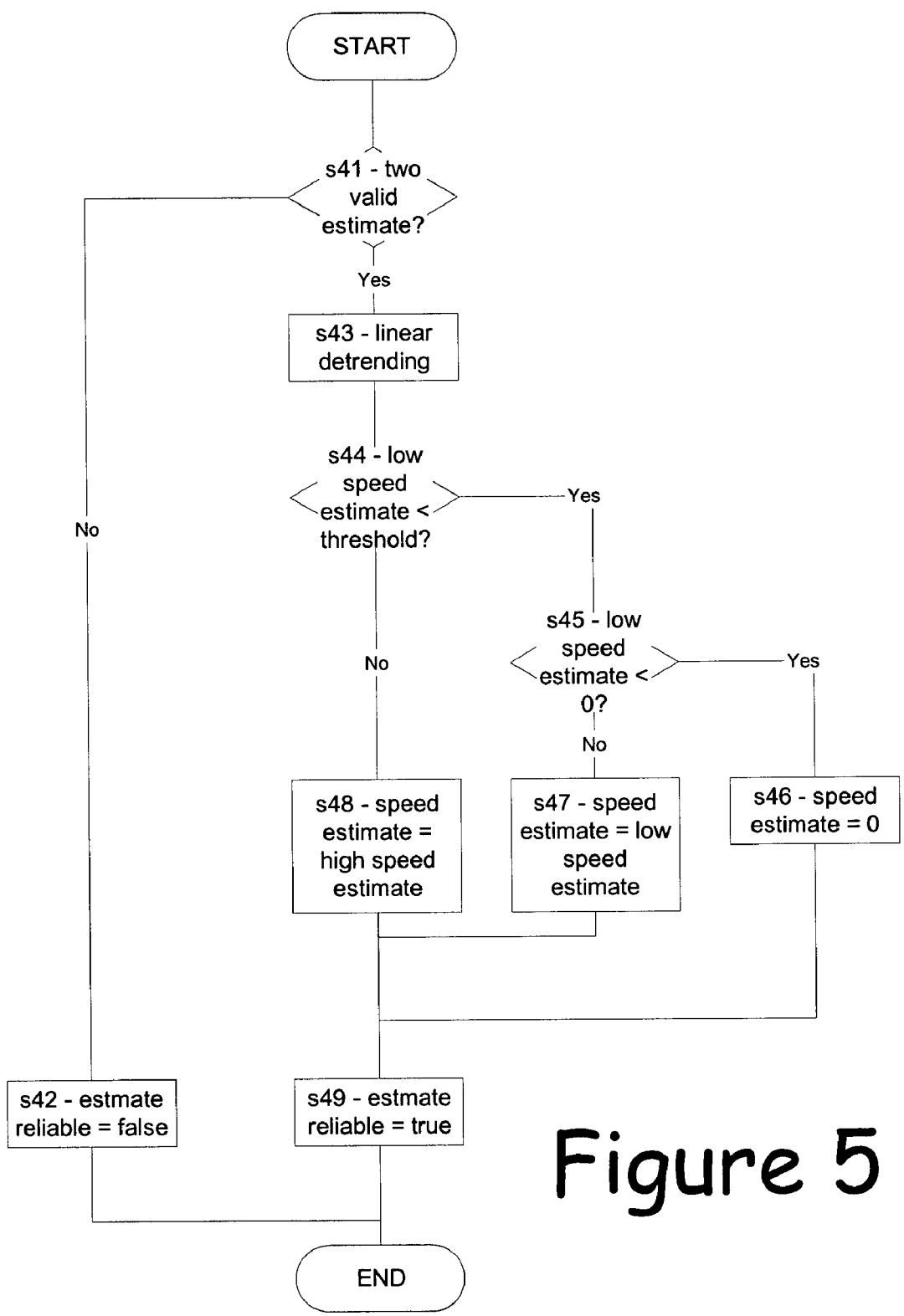
FIG. 5 is a flowchart illustrating a speed estimate selection process of the program of FIG. 2.

Referring to FIG. 5, when the speed estimation processes p2a, p2b have been completed, the speed selection process p3 determines whether both speed estimate process have produced reliable estimates (step s41). If one or both have not produced reliable estimates, as indicated by their respective reliability flags, no speed estimate is selected, a speed estimate reliability flag is set to false (step s42) and the process terminates.

If both speed estimation processes p2a, p2b produced valid speed estimates, the estimates are compensated for systematic errors introduced by the low-pass filtering and the speed estimation algorithm for low speeds (step s43). The compensation algorithm is a standard linear mapping of the form:

$$\hat{v}_{compensated} = \alpha(\hat{v}+\beta)$$

and in the present example $\alpha=1.7$ and $\beta=-12$ for the low speed speed estimate and $\alpha=1.1$ and $\beta=-20$ for the high speed speed estimate.

It is then determined whether the compensated low speed speed estimate is less than a threshold located within the overlap between the low and high speed ranges (step s44). If the low speed speed estimate is less than the threshold, it is determined whether the estimate is less than 0 (step s45) and, if so, the final speed estimate is set to 0 (step s46). If the compensated low speed speed estimate is not less than 0 at step s45, the final speed estimate is set to the compensated low speed speed estimate (step s47).

If the compensated low speed speed estimate is not below the threshold at step s44, the final speed estimate is set to the compensated high speed speed estimate (step s48).

Following steps s46, s47 and s48, the speed estimate reliability flag is set to true.

If the speed estimate reliability flag is true, a speed estimate will now be available for use by the mobile station and can be reported to a fixed network node where it may be used to control handovers, for example.

It will be appreciated that many modifications may be made to the preferred embodiment described above. For example, additional loops may be introduced into the signal conditioning and speed estimating processes for iterating through different signal sources in the case of transmit diversity being used.

Figure 6:
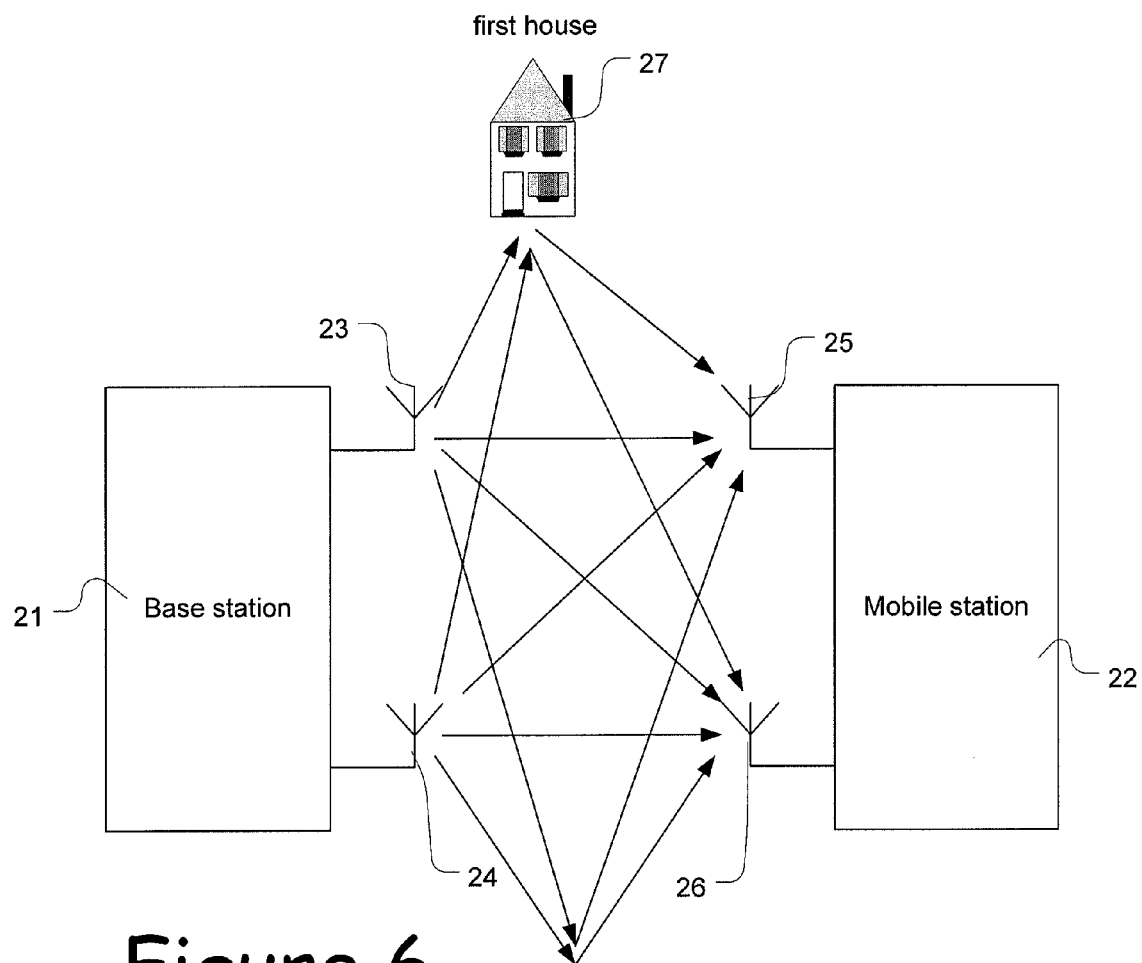
FIG. 6 illustrates a multi-input/multi-output (MIMO) radio communication system.

Referring to FIG. 6, a MIMO WCDMA mobile communication system comprises at least one base station 21 and at least one mobile station 22. The base station has two antennas 23, 24 and the mobile station 22 also has two antennas 25, 26.

The base station 21 concurrently transmits different data from each antenna 23, 24 using the same carrier frequency. The mobile station 22 uses both of its antennas 25, 26 to receive transmissions from the base station 21. Consequently, there are four spatially distinct channels between the base station's antennas 23, 24 and the mobile station's antennas. As shown in FIG. 6, a first spatial channel comprises the paths from the first base station antenna 23 to the first mobile station antenna 25, which consist of a direct path and paths involving reflections from first and second buildings 27, 28. A second spatial channel comprises the paths from the first base station antenna 23 to the second mobile station antenna 26, which consist of a direct path and paths involving reflections from first and second buildings 27, 28. A third spatial channel comprises the paths from the second base station antenna 24 to the first mobile station antenna 25, which consist of a direct path and paths involving reflections from first and second buildings 27, 28. A fourth spatial channel comprises the paths from the second base station antenna 24 to the second mobile station antenna 26, which consist of a direct path and paths involving reflections from first and second buildings 27, 28.

Figure 7:
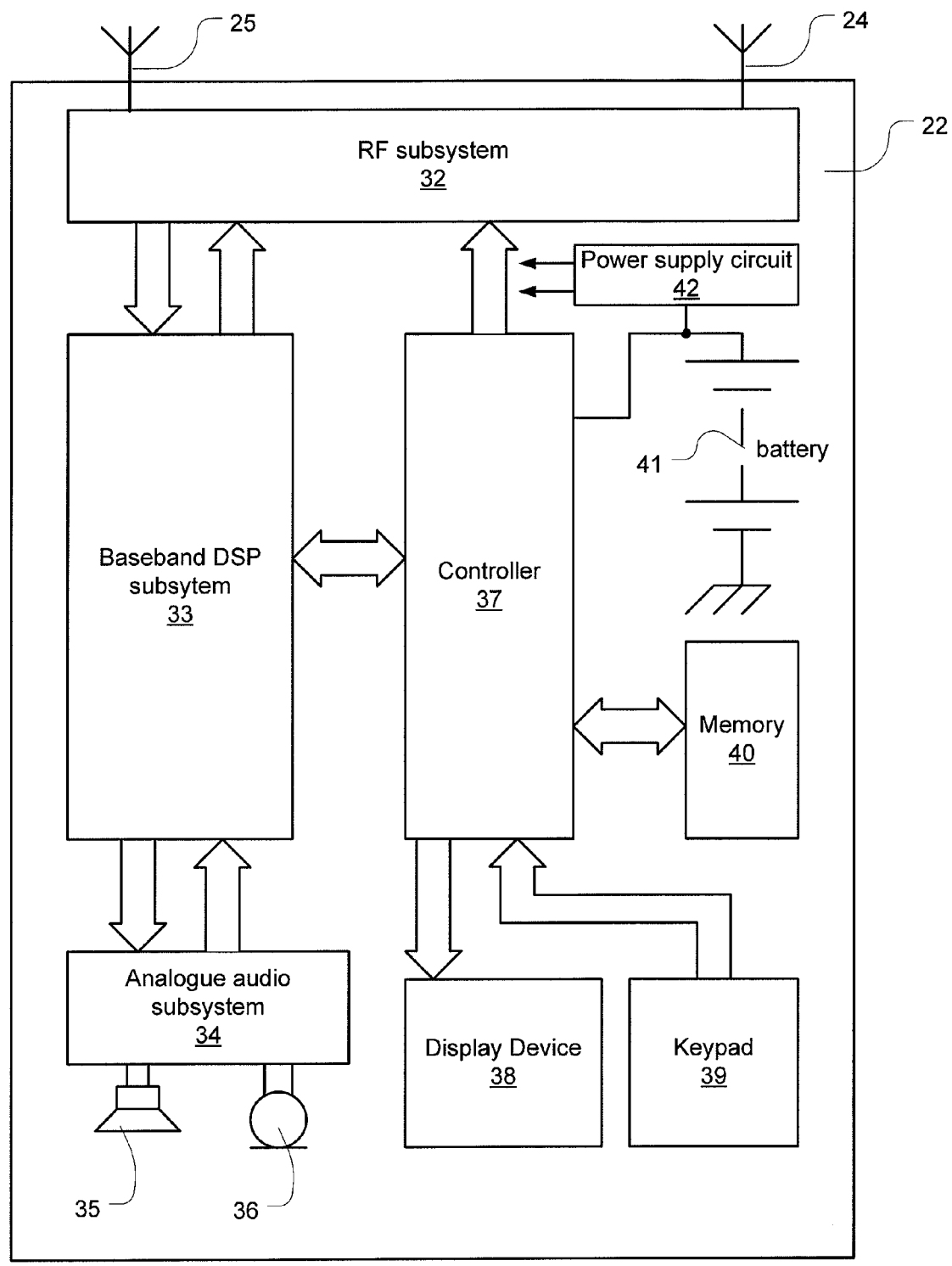
FIG. 7 is a block diagram of another mobile station.

Referring to FIG. 7, the mobile station 22 additionally comprises an rf subsystem 32, a baseband DSP (digital signal processor) subsystem 33, an analogue audio subsystem 34, a loudspeaker 35, a microphone 36, a controller 37, a liquid crystal display 38, a keypad 39, memory 40, a battery 41 and a power supply circuit 42.

The rf subsystem 32 contains if and rf circuits of the mobile station's transmitter and receiver and a frequency synthesizer for tuning the mobile station's transmitter and receiver. The antennas 25, 26 are coupled to the rf subsystem 2 for the reception and transmission of radio waves.

The baseband DSP subsystem 33 is coupled to the rf subsystem 32 to receive baseband signals therefrom and for sending baseband modulation signals thereto. The baseband DSP subsystems 33 includes codec and RAKE functionality, which are well-known in the art, and is programmed for estimating a received signal Doppler spread and the speed of the mobile station 22.

The analogue audio subsystem 34 is coupled to the baseband DSP subsystem 33 and receives demodulated audio therefrom. The analogue audio subsystem 34 amplifies the demodulated audio and applies it to the loudspeaker 35. Acoustic signals, detected by the microphone 36, are pre-amplified by the analogue audio subsystem 34 and sent to the baseband DSP subsystem 33 for coding.

The controller 37 controls the operation of the mobile station 22. It is coupled to the rf subsystem 32 for supplying tuning instructions to the frequency synthesizer and to the baseband DSP subsystem 33 for supplying control data and management data for transmission. The controller 37 operates according to a program stored in the memory 40. The memory 40 is shown separately from the controller 37. However, it may be integrated with the controller 37.

The display device 38 is connected to the controller 37 for receiving control data and the keypad 39 is connected to the controller 7 for supplying user input data signals thereto.

The battery 41 is connected to the power supply circuit 42 which provides regulated power at the various voltages used by the components of the mobile station 22.

The controller 37 is programmed to control the mobile station 22 for speech and data communication and with application programs, e.g. a WAP browser, which make use of the mobile station's data communication capabilities.

Since each of the mobile station's antennas 25, 26 receives the signals transmitted from each of the base station's antennas 23, 24, it is necessary for the transfer functions of the various paths, followed by the signals in the four spatial channels, to be known in order to separate the transmitted signals in the mobile station 22. Consequently, the DSP subsystem 33 is programmed to obtain channel estimates for the each of the paths. The details of this process are not material to the present invention. However, the channel estimates may be obtained by means of reference symbols in the transmitted signals. In such an example, different reference symbols are used for each transmitted signal. This enables the contributions from the different base station antennas 23, 24 to be separated. The different path delays means that the reference codes are detected, e.g. by autocorrelation, at different times depending on the path followed. Consequently, the contributions of signals from the same base station antenna 23, 24 but which followed different paths can also be separated.

Since the reference symbols are transmitted with known characteristics, the transfer functions of the various paths can be determined once the received signals have been separated according to source antenna and path.

In order to estimate the speed of the mobile station, the DSP subsystem 33 is programmed to perform speed estimation calculations appropriate for low and high speeds in parallel and then select the appropriate result.

Figure 8:
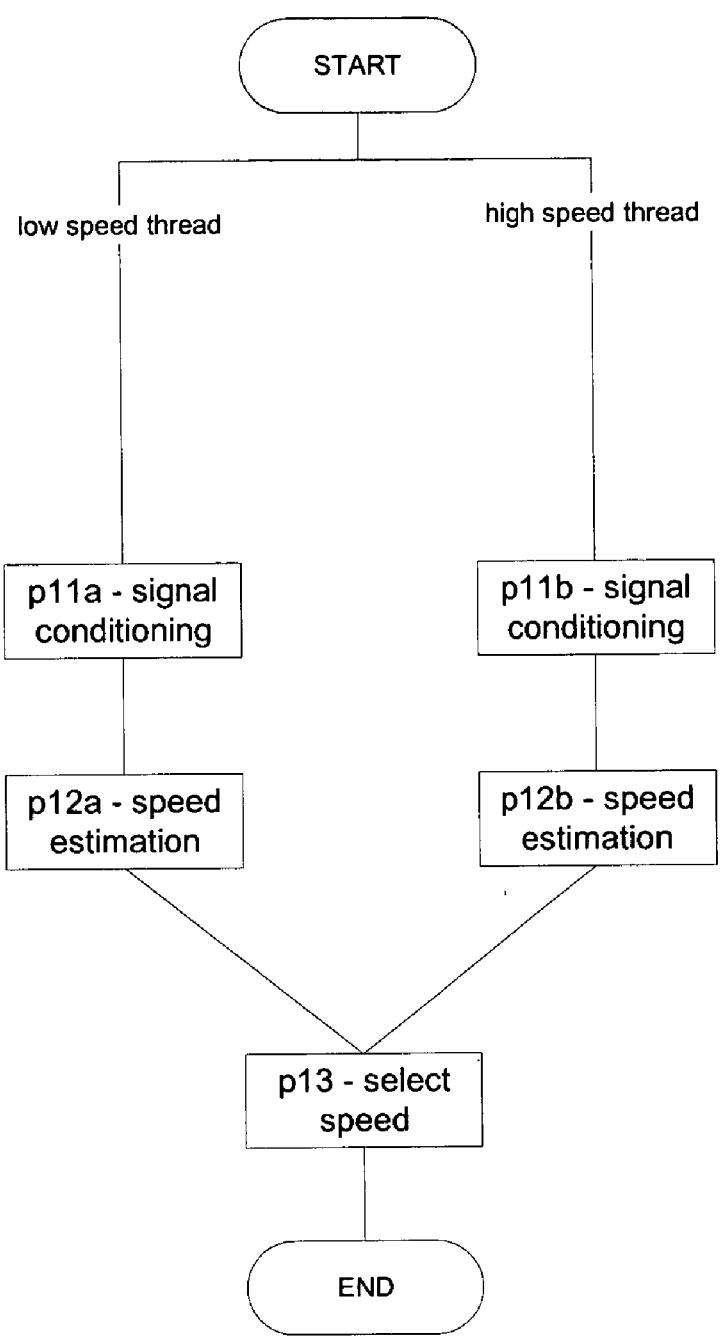
FIG. 8 is a flowchart illustrating a second speed estimating program according to the present invention.

Referring to FIG. 8, the speed estimation program of the DSP subsystem 33 receives a stream of in-phase and quadrature baseband signal components and provides time-domain samples of the transfer functions (H) of the signal paths from both base station antennas 23, 24 having the various delays handled by the RAKE processing. In the present example, these transfer function samples are obtained by demodulating the received signals for reference symbols with values representing the transmitted signals.

Signal conditioning is performed on the transfer function samples (step p11a and p11b) using algorithms adapted for low and high speed ranges respectively. The low and high speed ranges overlap in the present example. However, the upper edge of the lower range may simply meet the lower edge of the upper range. The conditioned signals are then used to produce speed estimates (steps p12a and p12b) and the appropriate speed estimate is selected (step p13).

The signal conditioning processes p11a, p11b loop through the RAKE fingers of both RAKE processes, i.e. the RAKE process for the signals from the first base station antenna 23 and the RAKE process for the signals from the second base station antenna 24, which process transfer function signals for respective different paths. Of course, if the mobile station does not employ a RAKE system, such as where the mobile station is not a CDMA device, there will be no need for this loop.

Figure 9:
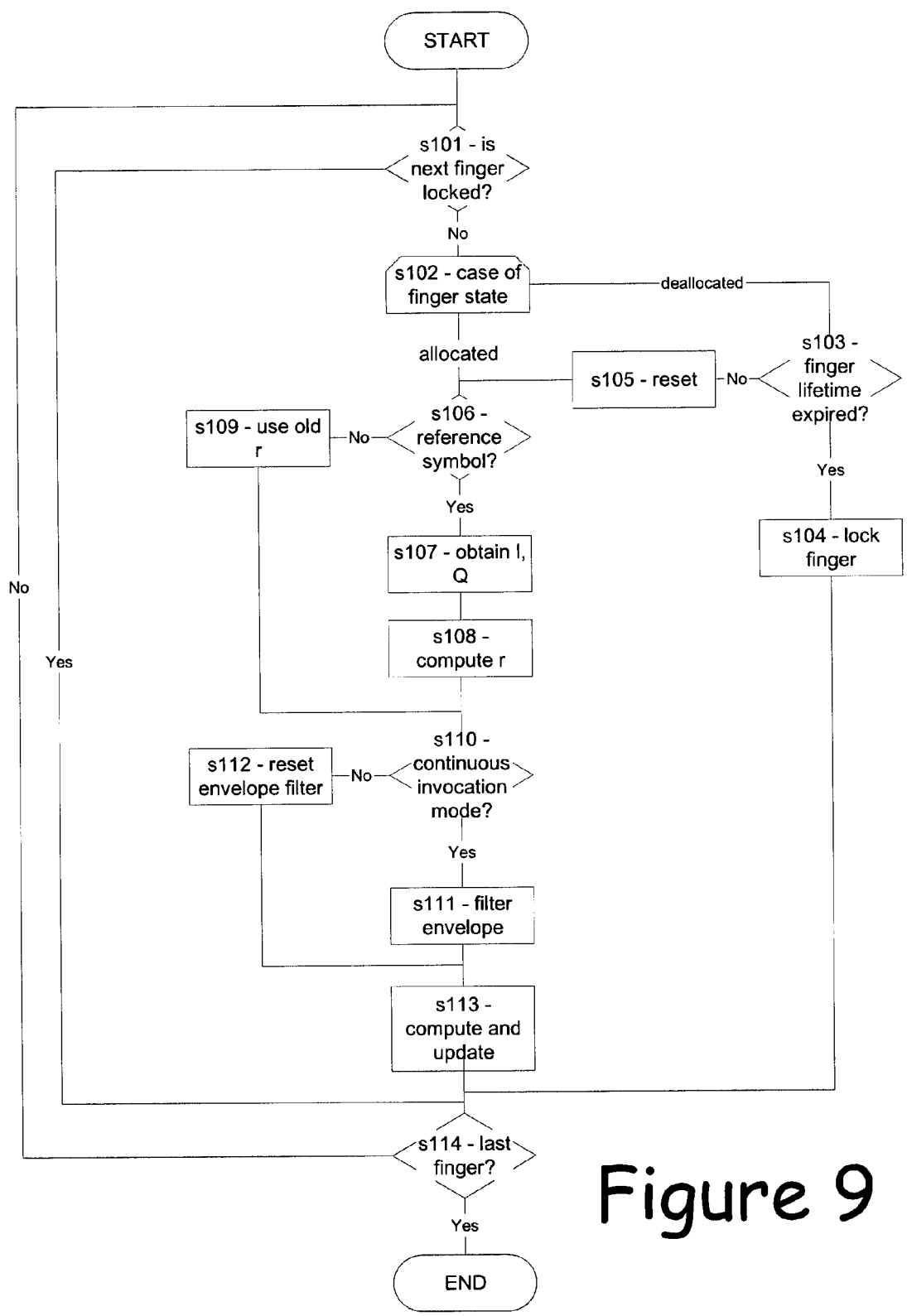
FIG. 9 is a flowchart illustrating a signal conditioning process of the program of FIG. 8.

Referring to FIG. 9, in the low speed signal conditioning estimation process p11a, it is first determined whether the RAKE finger to be processed is locked (step s101). A "locked" finger is one whose allocated lifetime has expired. If the finger is locked at step s101, processing for the current finger is skipped.

However, if the current finger is not locked at step s101, the state of the finger, i.e. deallocated or allocated to a radio path, is determined (step s102).

In the case of the current finger being in the deallocated state at step s102, it is determined whether the finger's lifetime has expired (step s103). If the finger's lifetime has expired at step s103, the finger is locked (step s104) and further processing for it is skipped. However, if the finger's lifetime has not expired at step s103, all variables and parameters for the current finger are reset (step s105).

In the case of the current finger being allocated at step s102 and following step s105, it is determined whether a valid reference symbol has been detected (step s106). The reference symbols occur regularly in signals transmitted to the mobile station and have known values. Therefore, values associated with like signals are used for calculation of the Doppler spread and speed. In the present case, the power at which the reference signals are transmitted is constant. However, if the power at which they are transmitted varies sufficiently quickly to affect the determined derivative value for the envelope, the magnitude of the envelope can be normalised using information about their transmission power. This information may be provided in control channels, for example.

If a valid reference symbol has been detected, in-phase (I) and quadrature (Q) component values for the transfer function are obtained (step s107). When the aforementioned I and Q values have been obtained, they are used to calculated the magnitude of the transfer function's envelope (r) (step s108).

However, if a valid reference symbol has not been detected, the previous value of transfer function's envelope magnitude is used to avoid gaps in the sequence of envelope magnitude values (step s109).

When the envelope magnitude value has been obtained, it is determined whether continuous invocation mode is being used (step s110). Continuous invocation mode is the normal mode of operation with an envelope value be obtained for each slot, i.e. regularly and frequently. However, under some circumstances, the speed estimation program may not be run in some slots. For instance the program may not be called during the transmission gap in compressed mode.

If operation is continuous, the new envelope magnitude value is fed into a low-pass filtering process (step s111). The low-pass filtering is provided by implementing a $3^{rd}$ order Butterworth IIR filter with a cutoff at 500 Hz. The filtering process for the low speed thread also performs downsampling by a factor of 2. The bandwidth of the filter is set to twice the maximum Doppler shift that can occur in the speed range covered. Thus, 500 Hz corresponds approximately to a speed of 125 km/h at 2.17 GHz.

If the operation is discontinuous, the filtering process s111 is skipped and the output of the filtering process s111 is replaced with the current envelope magnitude value (step s112).

The result of the filtering process s111 or the current envelope magnitude, as the case may be, is used to calculate the square of the envelope magnitude ($r_t^2$), the derivative of the envelope magnitude ($\dot{r}_t$) and the square of the derivative of the envelope magnitude ($\dot{r}_t^2$). Since, the envelope magnitudes are time-spaced samples, the derivative is approximated in the low speed thread using:

$$\hat{\dot{r}}_t = \frac{r_t - r_{t-\Delta T}}{\Delta T}$$

where ^ indicates an approximate or estimated value and $\Delta T$ is the sampling interval. It can be seen that this is a two-tap FIR filter.

These values are used to update accumulated values $$\sum_{n=1}^{N} r_{nT}^2, \sum_{n=1}^{N} \hat{\dot{r}}_{nT}, \sum_{n=1}^{N} \hat{\dot{r}}_{nT}^2$$

for the square of the envelope magnitude, the approximate derivative of the envelope magnitude and the square of the derivative of the envelope magnitude, where N is an observation window length in terms of sample (step s113). In the present example, N is 750.

If all of the fingers have been processed at step s114, the signal conditioning is complete. Otherwise, the process returns to step s101.

The high speed signal conditioning p11b is the same as the low speed signal conditioning except that the low-pass filter has a cut-off at 1 kHz rather than 500 kHz and the envelope magnitude derivative $\dot{r}_t$ is approximated using:

$$\hat{\dot{r}}_t = \frac{r_t - r_{t-2\Delta T}}{2\Delta T}$$

which is a 3-tap FIR filter having a zero coefficient for the middle tap.

The bandwidth of the filter is set to twice the maximum Doppler shift that can occur in the speed range covered. Thus, 1 kHz corresponds approximately to a speed of 250 km/h at 2.17 GHz.

The results of the low speed and high speed signal conditioning process p11a, p11b are supplied to the low speed and high speed speed estimating processes p12a, p12b respectively.

Figure 10:
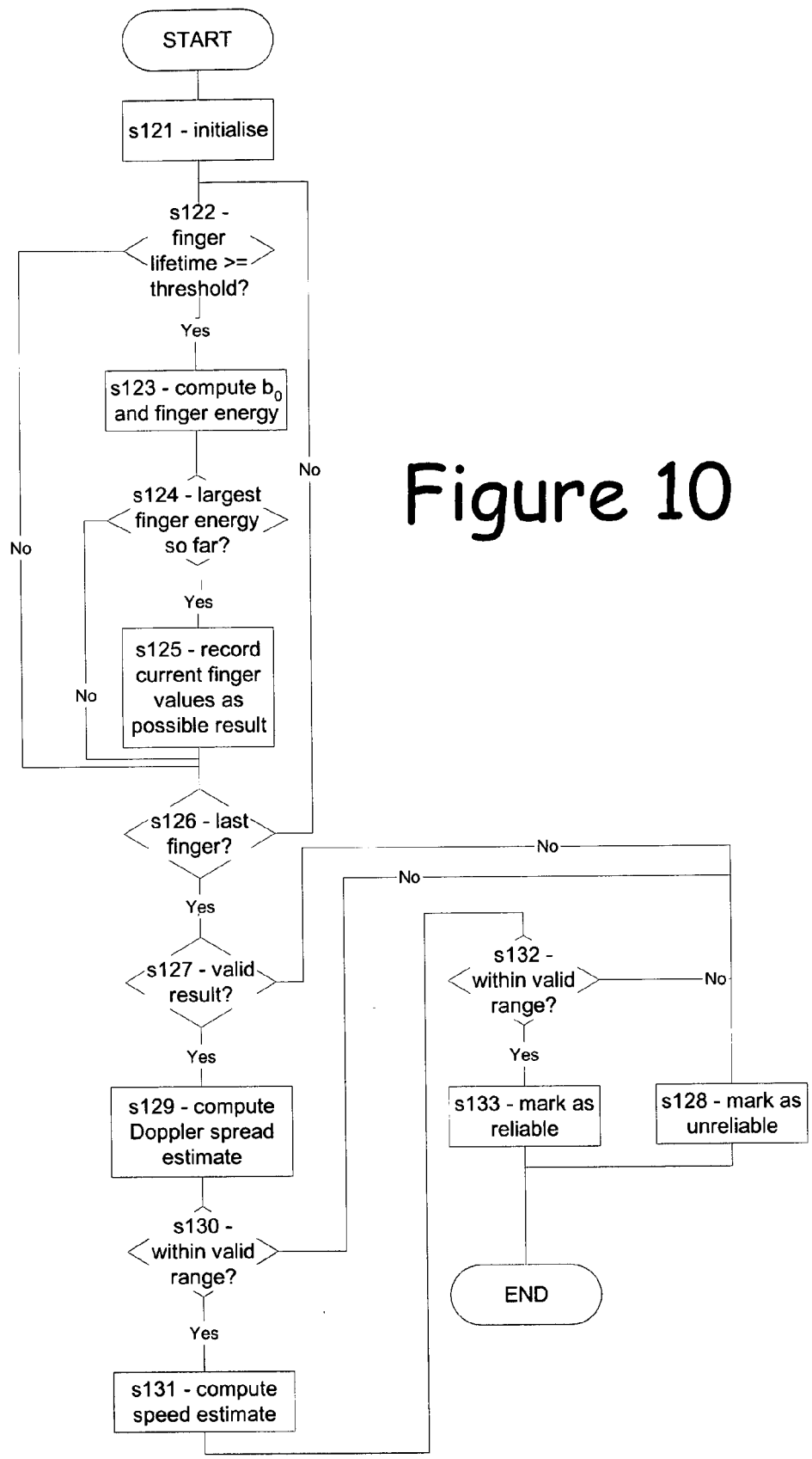
FIG. 10 is a flowchart illustrating a speed estimating process of the program of FIG. 8.

Referring to FIG. 10, at the start of the low speed estimating process p12a, an initialisation routine (step s121) sets a "finger valid flag" to true and a "maximum energy" variable to −1. After initialisation, the process enters a loop so that all of the RAKE fingers are processed in turn.

At the start of the loop, it is determined whether the current finger's lifetime is greater than or equal to a threshold (step s122). The threshold is set to identify fingers what are sufficiently old to provide sufficiently good data for reliable speed estimation. If the current finger's lifetime is less than the threshold, the process moves on to the next finger.

If at step s122, the current finger is sufficiently mature, a value $\hat{b}_0$ and an energy related value for the current finger are calculated (step s123). $\hat{b}_0$ is indicative of the power of the current finger and is calculated using:

$$\hat{b}_0 = \frac{1}{2} E\{r^2\}$$

where $E\{r^2\}$ is the mean of $$\sum_{n=1}^{N} r_{nT}^2$$

calculated at step s111 in FIG. 9.

The energy related value for the current finger is calculated by multiplying $\hat{b}_0$ by the current finger's age.

Following step s123, it is determined whether the current finger has the largest energy related value of the fingers processed so far (step s124) by comparing its energy with the "maximum energy" variable. If this is not the case, the process moves on to the next finger. However, if this is the case, the "finger valid flag" is set to true to indicate that data is now available for speed estimation, the "maximum energy" variable is set to the energy of the current finger and an index, identifying the current finger, is stored (step s125).

When all of the fingers have been processed (step s126), it is determined whether data suitable for speed estimation has been obtained by checking the state of the "finger valid flag" (step s127). If the "finger valid flag" is false, no further calculations are performed and the result of the low speed estimating process p12a is noted as being unreliable by setting a reliability flag to false. However, if the "finger valid flag" is true, the Doppler spread $\hat{f}_{d_{spread}}$ is estimated for the last finger whose index was stored at step s125 using:

$$\hat{f}_{d_{spread}} = \frac{1}{2\pi}\sqrt{\frac{2\hat{b}_2}{\hat{b}_0}}$$

where $$\hat{b}_2 = E\{\hat{r}^2\} - (E\{\hat{r}\})^2$$

where $E\{\hat{r}^2\}$ is the mean of $$\sum_{n=1}^{N}\hat{r}_{nT}^2$$

calculated at step s111 of FIG. 9 and $E\{\hat{r}\}$ is the mean of $$\sum_{n=1}^{N}\hat{r}_{nT}$$

calculated at step s111 of FIG. 9 (step s129).

The newly calculated Doppler spread estimate is checked to determine whether it falls within a range of valid values (step s130). If the Doppler spread estimate is outside the valid values range, the process proceeds to step s128. However, if it is within the valid values range, it is used to computer a speed estimate for the mobile station using:

$$\hat{v} = \frac{\hat{f}_{d_{spread}} c}{f_c}$$

where c is the velocity of light in free space and $f_c$ is the carrier frequency of the signal being received. It is determined whether the newly estimated speed value is within a valid range, i.e. below 500 km/h in the present example. (step s132). If not, the process moves to step s128. If the speed value is valid, the reliability flag is set to true.

The high speed speed estimating process p12b is identical except for the valid value ranges used at steps s130 and s132.

Figure 11:
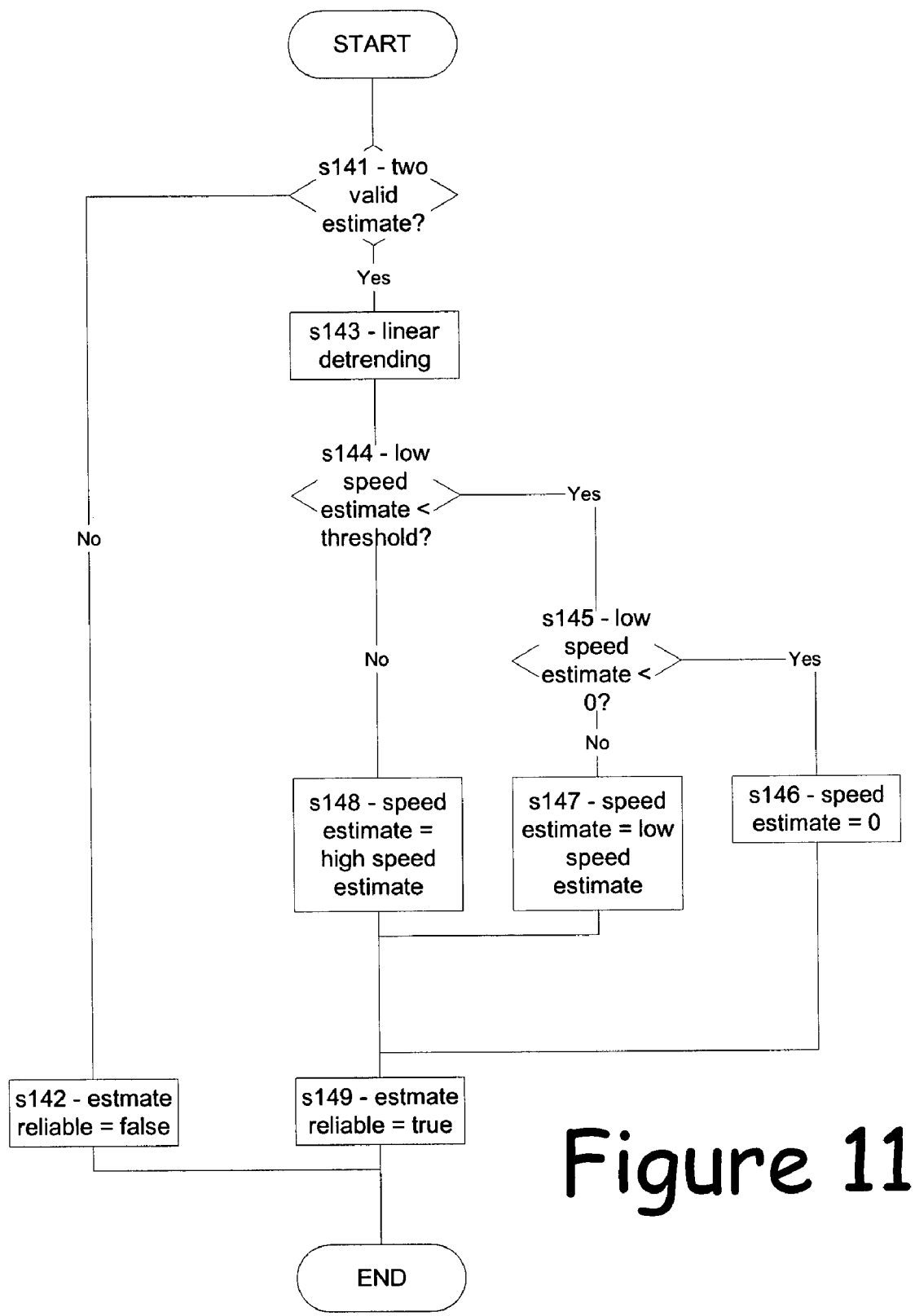
FIG. 11 is a flowchart illustrating a speed estimate selection process of the program of FIG. 8.

Referring to FIG. 11, when the speed estimation processes p12a, p2b have been completed, the speed selection process p13 determines whether both speed estimate process have produced reliable estimates (step s141). If one or both have not produced reliable estimates, as indicated by their respective reliability flags, no speed estimate is selected, a speed estimate reliability flag is set to false (step s142) and the process terminates.

If both speed estimation processes p12a, p12b produced valid speed estimates, the estimates are compensated for systematic errors introduced by the low-pass filtering and the speed estimation algorithm for low speeds (step s143). The compensation algorithm is a standard linear mapping of the form:

$$\hat{v}_{compensated} \alpha(\hat{v}+\beta)$$

and in the present example $\alpha=1.7$ and $\beta=-12$ for the low speed speed estimate and $\alpha=1.1$ and $\beta=-20$ for the high speed speed estimate.

It is then determined whether the compensated low speed speed estimate is less than a threshold located within the overlap between the low and high speed ranges (step s144). If the low speed speed estimate is less than the threshold, it is determined whether the estimate is less than 0 (step s145) and, if so, the final speed estimate is set to 0 (step s146). If the compensated low speed speed estimate is not less than 0 at step s145, the final speed estimate is set to the compensated low speed speed estimate (step s147).

If the compensated low speed speed estimate is not below the threshold at step s144, the final speed estimate is set to the compensated high speed speed estimate (step s148).

Following steps s146, s147 and s148, the speed estimate reliability flag is set to true.

If the speed estimate reliability flag is true, a speed estimate will now be available for use by the mobile station and can be reported to a fixed network node where it may be used to control handovers, for example.

Thus, the speed estimate is determined from the signal received with the highest energy.

In another MIMO system embodiment, the mobile station 22 is physically as described with reference to FIG. 7 but differs in the RAKE processing and the program for calculating the speed estimate.

The RAKE processing differs in that a separate RAKE process is provided for each antenna combination. That is, a first RAKE process processes signals from the first base station antenna 23 which are received at the first mobile station antenna 25, a second RAKE process processes signals from the second base station antenna 24 which are received at the first mobile station antenna 25, a third RAKE process processes signals from the first base station antenna 23 which are received at the second mobile station antenna 26 and a fourth RAKE process processes signals from the second base station antenna 24 which are received at the second mobile station antenna 26.

Figure 12:
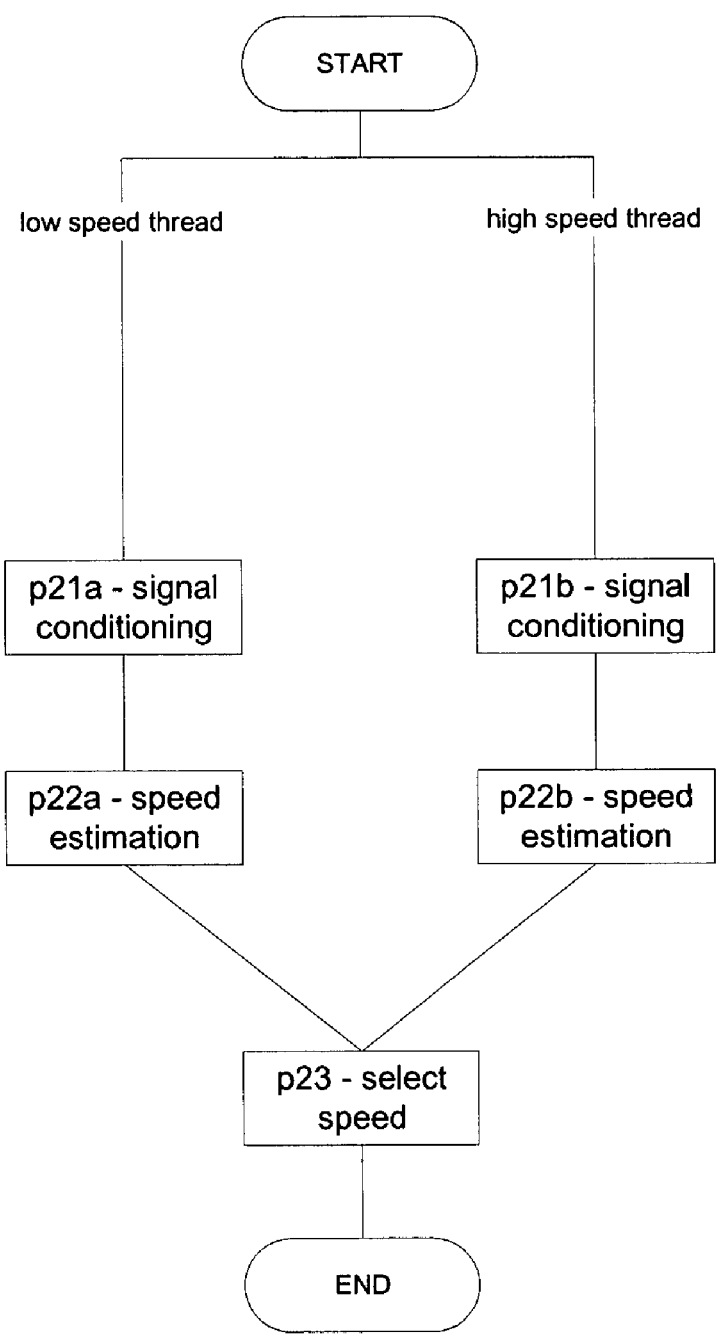
FIG. 12 is a flowchart illustrating a third speed estimating program according to the present invention.

Referring to FIG. 12, the speed estimation program of the DSP subsystem 33 receives a stream of in-phase and quadrature baseband signal components and provides time-domain samples of the transfer functions (H) of the signal paths from both base station antennas 23, 24 having the various delays handled by the four RAKE processes. In the present example, these transfer function samples are obtained by demodulating the received signals for reference symbols with values representing the transmitted signals.

Signal conditioning is performed on the transfer function samples (step p21a and p21b) using algorithms adapted for low and high speed ranges respectively. The low and high speed ranges overlap in the present example. However, the upper edge of the lower range may simply meet the lower edge of the upper range. The conditioned signals are then used to produce speed estimates (steps p22a and p22b) and the appropriate speed estimate is selected (step p23).

The signal conditioning processes p21a, p21b loop through the RAKE fingers of each RAKE process in four parallel threads.

Figure 13:
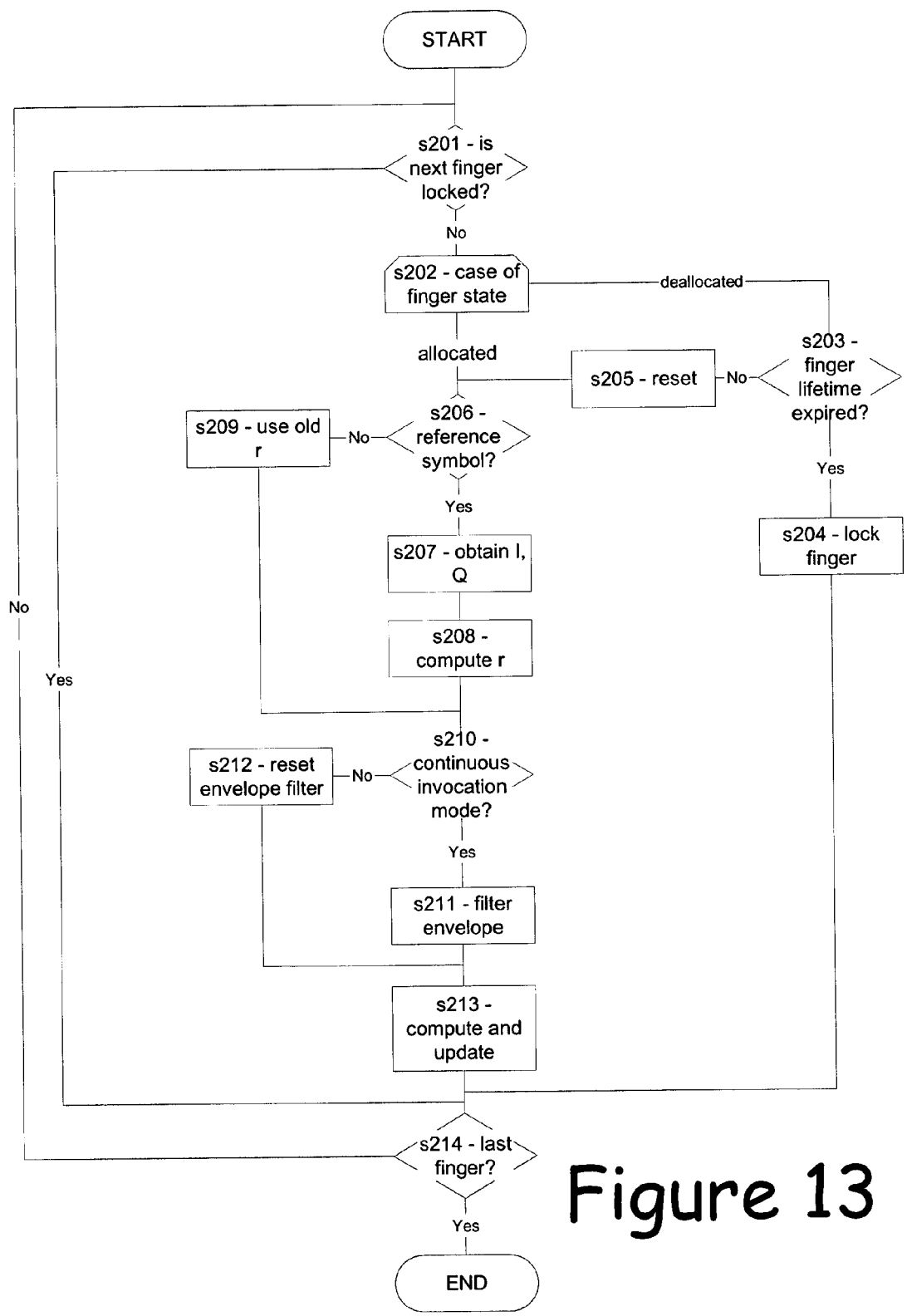
FIG. 13 is a flowchart illustrating a signal conditioning process of the program of FIG. 12.

Referring to FIG. 13, in each thread of the low speed signal conditioning estimation process p21a, it is first determined whether the RAKE finger to be processed is locked (step s201). A "locked" finger is one whose allocated lifetime has expired. If the finger is locked at step s201, processing for the current finger is skipped.

However, if the current finger is not locked at step s201, the state of the finger, i.e. deallocated or allocated to a radio path, is determined (step s202).

In the case of the current finger being in the deallocated state at step s202, it is determined whether the finger's lifetime has expired (step s203). If the finger's lifetime has expired at step s203, the finger is locked (step s204) and further processing for it is skipped. However, if the finger's lifetime has not expired at step s203, all variables and parameters for the current finger are reset (step s205).

In the case of the current finger being allocated at step s202 and following step s205, it is determined whether a valid reference symbol has been detected (step s206). The reference symbols occur regularly in signals transmitted to the mobile station and have known values. Therefore, values associated with like signals are used for calculation of the Doppler spread and speed. In the present case, the power at which the reference signals are transmitted is constant. However, if the power at which they are transmitted varies sufficiently quickly to affect the determined derivative value for the envelope, the magnitude of the envelope can be normalised using information about their transmission power. This information may be provided in control channels, for example.

If a valid reference symbol has been detected, in-phase (I) and quadrature (Q) component values for the transfer function are obtained (step s207). When the aforementioned I and Q values have been obtained, they are used to calculated the magnitude of the transfer function's envelope (r) (step s208).

However, if a valid reference symbol has not been detected, the previous value of transfer function's envelope magnitude is used to avoid gaps in the sequence of envelope magnitude values (step s209).

When the envelope magnitude value has been obtained, it is determined whether continuous invocation mode is being used (step s210). Continuous invocation mode is the normal mode of operation with an envelope value be obtained for each slot, i.e. regularly and frequently. However, under some circumstances, the speed estimation program may not be run in some slots. For instance the program may not be called during the transmission gap in compressed mode.

If operation is continuous, the new envelope magnitude value is fed into a low-pass filtering process (step s211). The low-pass filtering is provided by implementing a $3^{rd}$ order Butterworth IIR filter with a cutoff at 500 Hz. The filtering process for the low speed thread also performs downsampling by a factor of 2. The bandwidth of the filter is set to twice the maximum Doppler shift that can occur in the speed range covered. Thus, 500 Hz corresponds approximately to a speed of 125 km/h at 2.17 GHz.

If the operation is discontinuous, the filtering process s211 is skipped and the output of the filtering process s211 is replaced with the current envelope magnitude value (step s212).

The result of the filtering process s211 or the current envelope magnitude, as the case may be, is used to calculate the square of the envelope magnitude ($r_t^2$), the derivative of the envelope magnitude ($\dot{r}_t$) and the square of the derivative of the envelope magnitude ($\dot{r}_t^2$). Since, the envelope magnitudes are time-spaced samples, the derivative is approximated in the low speed thread using:

$$\hat{\dot{r}}_t = \frac{r_t - r_{t-\Delta T}}{\Delta T}$$

where ^ indicates an approximate or estimated value and $\Delta T$ is the sampling interval. It can be seen that this is a two-tap FIR filter.

These values are used to update accumulated values $$\sum_{n=1}^{N} r_{nT}^2, \sum_{n=1}^{N} \hat{\dot{r}}_{nT}, \sum_{n=1}^{N} \hat{\dot{r}}_{nT}^2$$

for the square of the envelope magnitude, the approximate derivative of the envelope magnitude and the square of the derivative of the envelope magnitude, where N is an observation window length in terms of sample (step s213). In the present example, N is 750.

If all of the fingers have been processed at step s214, the signal conditioning is complete. Otherwise, the process returns to step s201.

The high speed signal conditioning p21b is the same as the low speed signal conditioning except that the low-pass filter has a cut-off at 1 kHz rather than 500 kH and the envelope magnitude derivative $\dot{r}_t$ is approximated using:

$$\hat{\dot{r}}_t = \frac{r_t - r_{t-2\Delta T}}{2\Delta T}$$

which is a 3-tap FIR filter having a zero coefficient for the middle tap.

The bandwidth of the filter is set to twice the maximum Doppler shift that can occur in the speed range covered. Thus, 1 kH corresponds approximately to a speed of 250 km/h at 2.17 GHz.

The four results of the low speed and high speed signal conditioning processes p21a, p21b are supplied to respective threads of the low speed and high speed speed estimating processes p22a, p22b.

Figure 14:
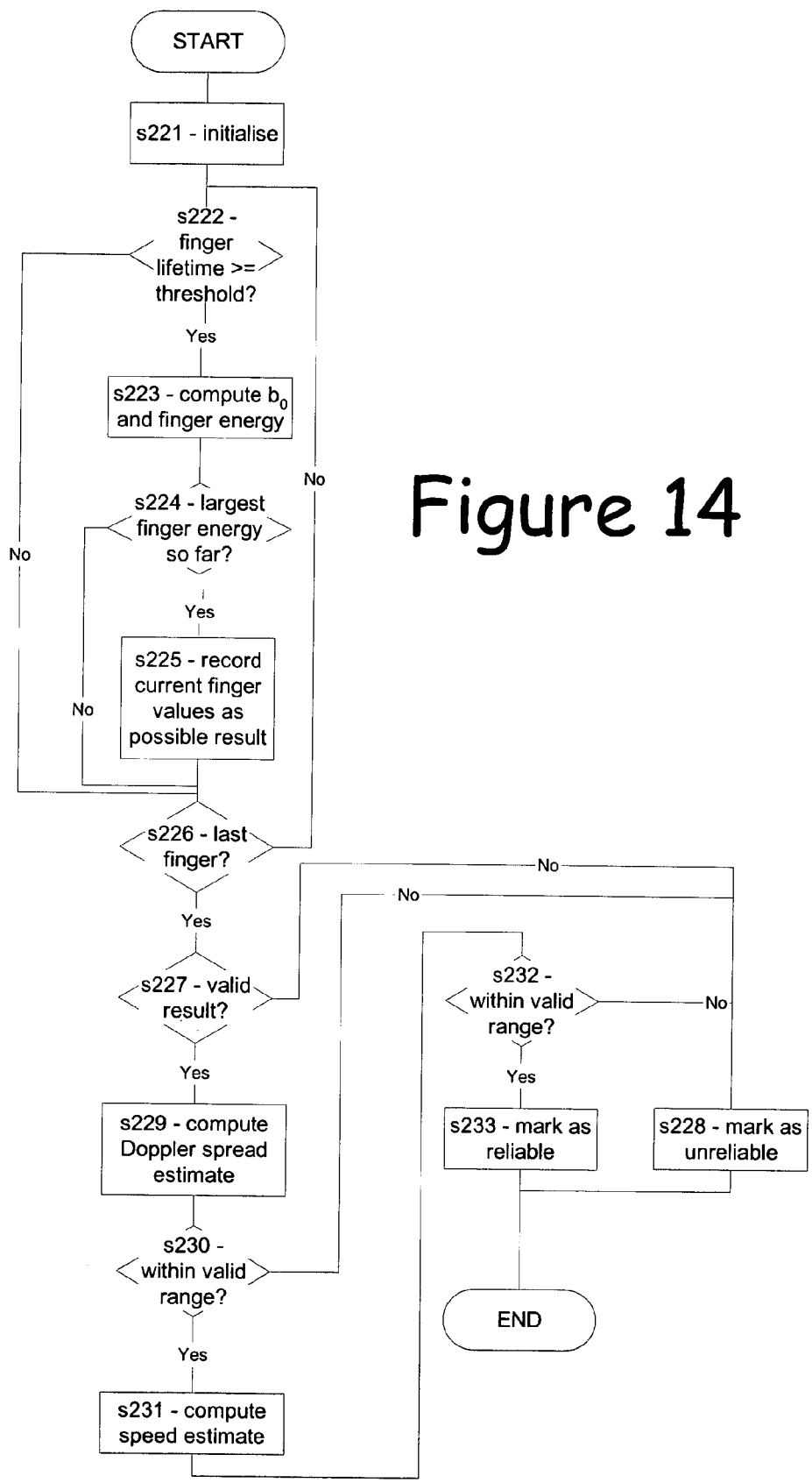
FIG. 14 is a flowchart illustrating a speed estimating process of the program of FIG. 12.

Referring to FIG. 14, at the start of each thread of the low speed estimating process p22a, an initialisation routine (step s221) sets a "finger valid flag" to true and a "maximum energy" variable to −1. After initialisation, the thread enters a loop so that all of the RAKE fingers of the associated RAKE process are processed in turn.

At the start of the thread's loop, it is determined whether the current finger's lifetime is greater than or equal to a threshold (step s222). The threshold is set to identify fingers what are sufficiently old to provide sufficiently good data for reliable speed estimation. If the current finger's lifetime is less than the threshold, the process moves on to the next finger.

If at step s222, the current finger is sufficiently mature, a value $\hat{b}_0$ and an energy related value for the current finger are calculated (step s223). $\hat{b}_0$ is indicative of the power of the current finger and is calculated using:

$$\hat{b}_0 = \frac{1}{2} E\{r^2\}$$

where $E\{r^2\}$ is the mean of $$\sum_{n=1}^{N} r_{nT}^2$$

calculated at step s211 in FIG. 13.

The energy related value for the current finger is calculated by multiplying $\hat{b}_0$ by the current finger's age.

Following step s223, it is determined whether the current finger has the largest energy related value of the fingers processed so far (step s224) by comparing its energy with the "maximum energy" variable. If this is not the case, the process moves on to the next finger. However, if this is the case, the "finger valid flag" is set to true to indicate that data is now available for speed estimation, the "maximum energy" variable is set to the energy of the current finger and an index, identifying the current finger, is stored (step s225).

When all of the fingers have been processed (step s226), it is determined whether data suitable for speed estimation has been obtained by checking the state of the "finger valid flag" (step s227). If the "finger valid flag" is false, no further calculations are performed and the result of the low speed estimating process p22a is noted as being unreliable by setting a reliability flag to false. However, if the "finger valid flag" is true, the Doppler spread $\hat{f}_{d_{spread}}$ is estimated for the last finger whose index was stored at step s225 using:

$$\hat{f}_{d_{spread}} = \frac{1}{2\pi}\sqrt{\frac{2\hat{b}_2}{\hat{b}_0}}$$

where $$\hat{b}_2 = E\{\hat{r}^2\} - (E\{\hat{r}\})^2$$

where $E\{\hat{r}^2\}$ is the mean of $$\sum_{n=1}^{N} \hat{r}_{nT}^2$$

calculated at step s211 of FIG. 9 and $E\{\hat{r}\}$ is the mean of $$\sum_{n=1}^{N} \hat{r}_{nT}$$

calculated at step s211 of FIG. 9 (step s129).

The newly calculated Doppler spread estimate is checked to determine whether it falls within a range of valid values (step s230). If the Doppler spread estimate is outside the valid values range, the process proceeds to step s228. However, if it is within the valid values range, it is used to computer a speed estimate for the mobile station using:

$$\hat{v} = \frac{\hat{f}_{d_{spread}} c}{f_c}$$

where c is the velocity of light in free space and $f_c$ is the carrier frequency of the signal being received. It is determined whether the newly estimated speed value is within a valid range, i.e. below 500 km/h in the present example, (step s232). If not, the process moves to step s228. If the speed value is valid, the reliability flag is set to true.

When the four threads have terminated, a mean or a linearly or non-linearly weighted sum, weighted according to $E\{r^2\}$, of the reliable speed values generated by the threads, if any, is calculated to produce the final low speed speed estimate. Alternatively the speed value is generated by the thread corresponding to the maximum value of $E\{r^2\}$. Alternatively, the median of the, if any, reliable speed value can be taken a the final low speed speed estimate. If at least one thread produced a reliable estimate, a low speed reliability flag is set to true. Otherwise, the low speed reliability flag is set to false.

The high speed speed estimating process p22b is identical except for the valid value ranges used at steps s230 and s232 and the setting of a high speed reliability flag.

Figure 15:
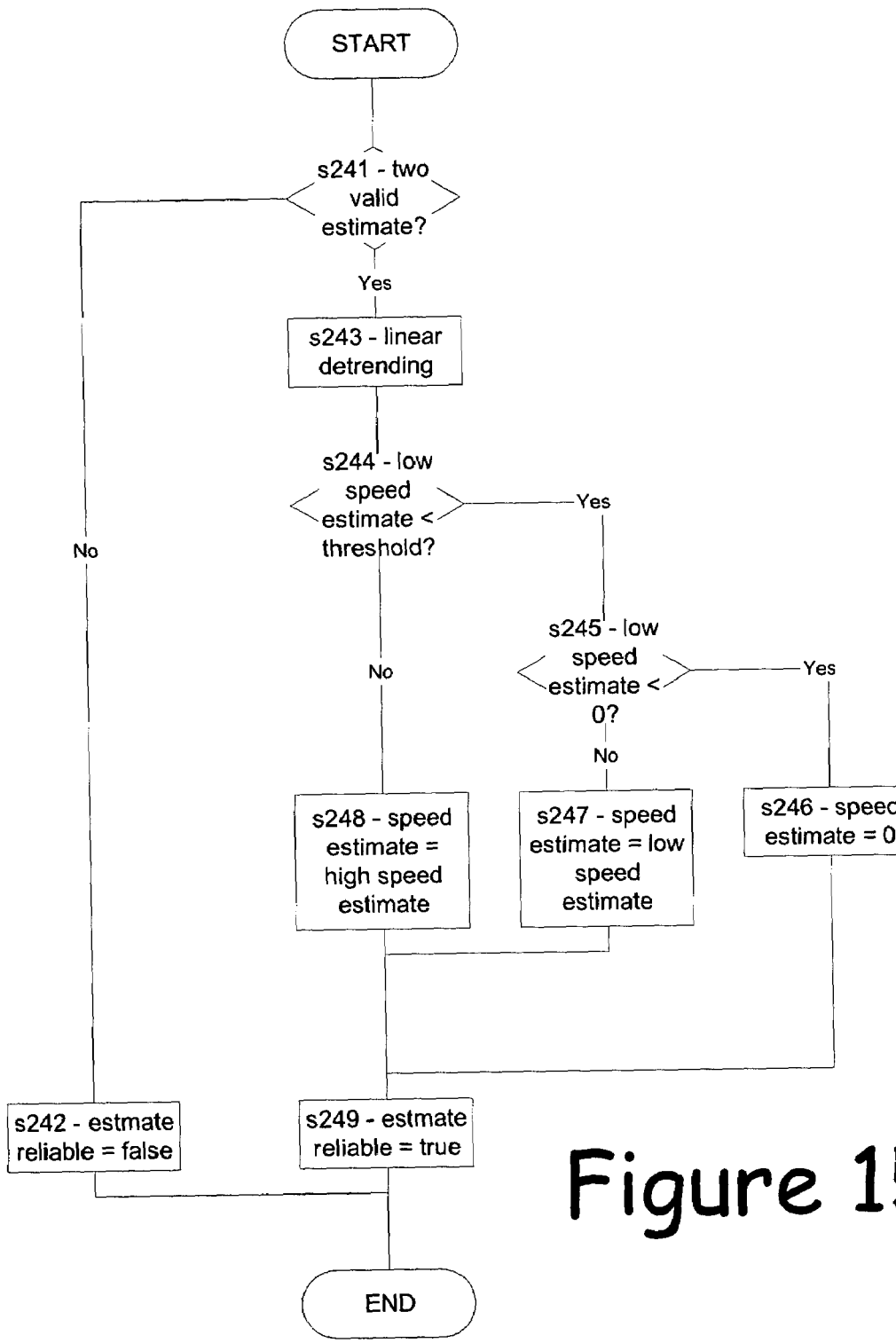
FIG. 15 is a flowchart illustrating a speed estimate selection process of the program of FIG. 12.

Referring to FIG. 15, when the speed estimation processes p22a, p22b have been completed, the speed selection process p23 determines whether both speed estimate process have produced reliable estimates by inspecting the low and high speed reliability flags (step s241). If one or both have not produced reliable estimates, as indicated by their respective reliability flags, no speed estimate is selected, a speed estimate reliability flag is set to false (step s242) and the process terminates.

If both speed estimation processes p22a, p22b produced valid speed estimates, the estimates are compensated for systematic errors introduced by the low-pass filtering and the speed estimation algorithm for low speeds (step s243). The compensation algorithm is a standard linear mapping of the form:

$$\hat{v}_{compensated} \alpha (\hat{v} + \beta)$$

and in the present example $\alpha=1.7$ and $\beta=-12$ for the low speed speed estimate and $\alpha=1.1$ and $\beta=-20$ for the high speed speed estimate.

It is then determined whether the compensated low speed speed estimate is less than a threshold located within the overlap between the low and high speed ranges (step s244). If the low speed speed estimate is less than the threshold, it is determined whether the estimate is less than 0 (step s245) and, if so, the final speed estimate is set to 0 (step s246). If the compensated low speed speed estimate is not less than 0 at step s245, the final speed estimate is set to the compensated low speed speed estimate (step s247).

If the compensated low speed speed estimate is not below the threshold at step s244, the final speed estimate is set to the compensated high speed speed estimate (step s248).

Following steps s246, s247 and s248, the speed estimate reliability flag is set to true.

If the speed estimate reliability flag is true, a speed estimate will now be available for use by the mobile station and can be reported to a fixed network node where it may be used to control handovers, for example.

In another MIMO system embodiment, neural networks are used to generate the final low speed and high speed speed estimates from the value produced by the four threads in each of the low speed and high speed estimation processes p22a, p22b. The neural networks are trained from simulations sweeping over relevant signal to noise ratios and various radio channel configurations.

In the foregoing MIMO system embodiments, both the base station and the mobile station have two antennas. However, other numbers of antennas at the base and mobile station may be used.

The present invention can also be applied in SIMO (Single Input Multi Output) and MISO (Multi Input Single Output) systems where the same problem of multiple concurrent signals on the same carrier arises. In each case, there are multiple paths and one path is selected by a process substantially as described above to provide the Doppler estimate.

In the foregoing, speed estimates are determined for two speed ranges. However, calculations may be performed for more or fewer speed ranges as required. More ranges give better performance but at the cost of increased complexity. Also, higher order low-pass filters give better performance but again at the cost of increased complexity.

In the foregoing, the Doppler spread and speed calculations are performed in a mobile station. However, these calculations could be performed at a fixed network node using signal strength reports from a mobile station. Alternatively, the calculations could be performed in part by a mobile station, e.g. the signal conditioning processes, and in part by a fixed network node, e.g. the speed estimation and selection processes.

The invention claimed is:

1. A method of estimating the speed of a mobile station in a MIMO, SIMO or MISO wireless communication system, the method comprising:
   concurrently receiving a plurality of radio signals;
   deriving a value for the derivative of the envelope of the path transfer function for each radio signal based on the plurality of received radio signals;
   computing an estimate of the Doppler spread of each of said radio signals from said derivative values; and
   deriving a value for the speed of said mobile station from said Doppler spread estimates.

2. A method according to claim 1, wherein said values for the derivatives of said envelopes are derived by low-pass filtering an envelope signal representing the corresponding path transfer function envelope to band limit it and filtering the band-limited envelope signal using an Infinite Impulse Response (IIR) or Finite Impulse Response (FIR) filter.

3. A method according to claim 2, wherein said envelope signals comprise respective sequences of samples representing the corresponding path transfer function envelope.

4. A method according to claim 2, wherein the computing of said estimates of the Doppler spreads comprises determining the variances of said derivative values.

5. A method according to claim 4, wherein the computing of said estimates of the Doppler spreads comprises determining a value indicative of the received powers of said radio signals.

6. A method according to claim 5, wherein the Doppler spread estimates are each calculated by determining the square root of the result of dividing twice the corresponding variance by the value indicative of the received power of the respective radio signal.

7. A method according to claim 6, wherein the Doppler spread estimates are each calculated in accordance with the formula:

$$\text{Doppler spread} \propto \sqrt{\frac{2\hat{b}_2}{\hat{b}_0}} \text{ where}$$

$$\hat{b}_2 = \frac{1}{N}\sum_{n=1}^{N}\hat{r}_{nT}^2 - \left(\frac{1}{N}\sum_{n=1}^{N}\hat{r}_{nT}\right)^2 \text{ and}$$

-continued $$\hat{b}_0 = \frac{1}{2N}\sum_{n=1}^{N}r_{nT}^2$$

where r is the magnitude of the corresponding radio signal, N is an observation window length in terms of sample, $r_{nT}$ is a sample of r, and $\hat{r}_{nT}$ is an approximated or estimate value of the derivative of $r_{nT}$.

8. A method according to claim 1, wherein the speed of the mobile station is calculated in accordance with the formula:

$$\text{speed} \propto \frac{f_{d_{spread}}}{f_c}$$

where $f_{d\ spread}$ is the Doppler spread of the signal having the greatest energy during calculation of said derivatives and $f_c$ is the carrier frequency of said radio signal.

9. A method according to claim 1, wherein the speed of the mobile station is calculated as the mean of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

10. A method according to claim 1, wherein the speed of the mobile station is calculated as a weighted sum of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

11. A method according to claim 1, wherein the speed of the mobile station is calculated as the median of speeds calculated for a plurality of said signals in accordance with the formula:

$$\text{speed} \propto \frac{f_{d_{spread}}}{f_c}$$

where $f_{d\ spread}$ the Doppler spread of a signal and $f_c$ is the carrier frequency of said signal.

12. A method of estimating the speed of a mobile station in a MIMO, SIMO or MISO wireless communication system, the method comprising:
   concurrently receiving a plurality of radio signals;
   deriving first and second values for the derivative of the envelope of the path transfer function for each radio signal based on the plurality of received radio signals;

computing first and second estimates of the Doppler spread of each of said radio signals from said derivative values; and deriving a value for the speed of said mobile station from said Doppler spread estimates.

13. A method according to claim 12, wherein said first value for the derivative of the envelope of each of said radio signals is derived by low-pass filtering an envelope signal representing the corresponding path transfer function envelope to band limit it and filtering the band-limited envelope signal using an Infinite Impulse Response (IIR) or Finite Impulse Response (FIR) filter and said second value for the derivative of the envelope of each of said radio signals is derived by low-pass filtering an envelope signal representing the path transfer function envelope to band limit it and filtering the band-limited envelope signal using an IIR or FIR filter, the first values being derived using a low-pass filter characteristic having a lower cut-off frequency than that of the low-pass filter characteristic used for deriving said second values.

14. A method according to claim 13, wherein the low-pass filtering for the first values is followed by downsampling.

15. A method according to claim 13, wherein said envelope signals comprise sequences of samples representing the respective path transfer function envelopes.

16. A method according to claim 13, wherein the computing of said first and second estimates of the Doppler spreads comprises determining the variances of said first and second derivative values respectively.

17. A method according to claim 16, wherein the computing of each of said estimates of the Doppler spread comprises determining a value indicative of the received power of the corresponding radio signal.

18. A method according to claim 17, wherein the first and second Doppler spread estimates are calculated by determining the square root of the result of dividing twice the respective variance by said value indicative of the received power of the respective radio signal.

19. A method according to claim 12, wherein the Doppler spread estimates are each calculated in accordance with the formula:

$$\text{Doppler spread} \propto \sqrt{\frac{2\hat{b}_2}{\hat{b}_0}} \quad \text{where}$$

$$\hat{b}_2 = \frac{1}{N}\sum_{n=1}^{N}\hat{r}_{nT}^2 - \left(\frac{1}{N}\sum_{n=1}^{N}\hat{r}_{nT}\right)^2 \text{ and}$$

$$\hat{b}_0 = \frac{1}{2N}\sum_{n=1}^{N}r_{nT}^2$$

where r is the magnitude of the corresponding radio signal, N is an observation window length in terms of sample, $r_{nT}$ is a sample of r, and $\hat{r}_{nT}$ is an approximated or estimate value of the derivative of $r_{nT}$.

20. A method according to claim 12, comprising deriving first and second speed estimates values from the first and second Doppler spreads respectively and selecting the first or second speed estimate value in dependent on the magnitude of the first or second speed estimate value to provide said speed estimate.

21. A method according to claim 20, wherein the first and second speed estimates are calculated in accordance with the formula:

$$\text{speed} \propto \frac{f_{d_{spread}}}{f_c}$$

where $f_{d\ spread}$ is the Doppler spread of the signal having the greatest energy during calculation of said respective derivatives and $f_c$ is the carrier frequency of said radio signal.

22. A method according to claim 20, wherein the first and second speed estimates are calculated as the mean of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

23. A method according to claim 20, wherein the first and second speed estimates are calculated as a weighted sum of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

24. A method according to claim 20, wherein the first and second speed estimates are calculated as the median of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

25. A mobile station of a MIMO, SIMO or MISO wireless communication network, the mobile station including radio receiver means having at least one antenna for receiving a plurality of radio signals and outputting corresponding baseband signals and processing means for processing said baseband signals, wherein the processing means is configured for estimating the Doppler spread of a radio signal by:

deriving a value for the derivative of the envelope of the path transfer function for each received radio signal;

computing an estimate of the Doppler spread of each of said radio signals from said derivative values; and deriving a value for the speed of said mobile station from said Doppler spread estimates.

26. A mobile station according to claim 25, wherein said processing means is configured such that said values for the derivatives of said envelopes are derived by low-pass filtering an envelope signal representing the corresponding path transfer function envelope to band limit it and filtering the band-limited envelope signal using an Infinite Impulse Response (IIR) or Finite Impulse Response (FIR) filter.

27. A mobile station according to claim 25, wherein the radio receiver means outputs said baseband signals as respective sequences of samples.

28. A mobile station according to claim 25, wherein the processing means is configured such that the computing of said estimates of the Doppler spreads comprises determining the variances of said derivative values.

29. A mobile station according to claim 28, wherein the processing means is configured such that the computing of said estimates of the Doppler spreads comprises determining a value indicative of the received powers of said radio signals.

30. A mobile station according to claim 29, wherein the processing means is configured such that the Doppler spread estimates are each calculated by determining the square root of the result of dividing twice the corresponding variance by the value indicative of the received power of the respective radio signal.

31. A mobile station according to claim 25, wherein the processing means is configured such that the Doppler spread estimates are each calculated in accordance with the formula:

$$\text{Doppler spread} \propto \sqrt{\frac{2\hat{b}_2}{\hat{b}_0}} \text{ where}$$

$$\hat{b}_2 = \frac{1}{N}\sum_{n=1}^{N} \hat{r}_{nT}^2 - \left(\frac{1}{N}\sum_{n=1}^{N} \hat{r}_{nT}\right)^2 \text{ and}$$

$$\hat{b}_0 = \frac{1}{2N}\sum_{n=1}^{N} r_{nT}^2$$

where r is the magnitude of the corresponding radio signal, N is an observation window length in terms of sample, $r_{nT}$ is a sample of r, and $\hat{r}_{nT}$ is an approximated or estimate value of the derivative of $r_{nT}$.

32. A method according to claim 25, wherein the processing means is configured such that the speed of the mobile station is calculated in accordance with the formula:

$$\text{speed} \propto \frac{f_{d_{spread}}}{f_c}$$

where $f_{d\ spread}$ is the Doppler spread of the signal having the greatest energy during calculation of said derivatives and $f_c$ is the carrier frequency of said radio signal.

33. A method according to claim 25, wherein the processing means is configured such that the speed of the mobile station is calculated as the mean of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

34. A method according to claim 25, wherein the processing means is configured such that the speed of the mobile station is calculated as a weighted sum of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

35. A method according to claim 25, wherein the processing means is configured such that the speed of the mobile station is calculated as the median of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

36. A mobile station of a MIMO, SIMO or MISO wireless communication network, the mobile station including radio receiver means having at least one antenna for concurrently receiving a plurality radio signals and outputting corresponding baseband signals and processing means for processing said baseband signals, wherein the processing means is configured for estimating the Doppler spread of a radio signal by:
deriving first and second values for the derivative of the envelope of the path transfer function for each radio signal;
computing first and second estimates of the Doppler spread of each of said radio signals from said derivative values; and
deriving a value for the speed of said mobile station from said Doppler spread estimates.

37. A mobile station according to claim 36, wherein said processing means is configured such that said first value for the derivative of the envelope of each of said radio signals is derived by low-pass filtering an envelope signal representing the corresponding path transfer function envelope to band limit it and filtering the band-limited envelope signal using an Infinite Impulse Response (IIR) or Finite Impulse Response (FIR) filter and said second value for the derivative of the envelope of each of said radio signals is derived by low-pass filtering an envelope signal representing the path transfer function envelope to band limit it and filtering the band-limited envelope signal using an IIR or FIR filter, the first values being derived using a low-pass filter characteristic having a lower cut-off frequency than that of the low-pass filter characteristic used for deriving said second values.

38. A mobile station according to claim 37, wherein the processing means is configured such that the low-pass filtering for the first values is followed by downsampling.

39. A mobile station according to claim 36, wherein the radio receiver means outputs said baseband signals as sequences of samples representing the respective path transfer function envelopes.

40. A mobile station according to claim 37, wherein the processing means is configured such that the computing of said first and second estimates of the Doppler spreads comprises determining the variances of said first and second derivative values respectively.

41. A mobile station according to claim 40, wherein the processing means is 30 configured such that the computing of each of said estimates of the Doppler spread comprises determining a value indicative of the received power of the corresponding radio signal.

42. A mobile station according to claim 41, wherein the processing means is configured such that the first and second Doppler spread estimates are calculated by determining the square root of the result of dividing twice the respective variance by said value indicative of the received power of the respective radio signal.

43. A mobile station according to claim 37, wherein the processing means is configured such that the Doppler spread estimates are each calculated in accordance with the formula:

$$\text{Doppler spread} \propto \sqrt{\frac{2\hat{b}_2}{\hat{b}_0}} \text{ where}$$

$$\hat{b}_2 = \frac{1}{N}\sum_{n=1}^{N}\hat{r}_{nT}^2 - \left(\frac{1}{N}\sum_{n=1}^{N}\hat{r}_{nT}\right)^2 \text{ and}$$

$$\hat{b}_0 = \frac{1}{2N}\sum_{n=1}^{N}r_{nT}^2$$

where r is the magnitude of the corresponding radio signal, N is an observation window length in terms of sample, $r_{nT}$ is a sample of r, and $\hat{r}_{nT}$ is an approximated or estimate value of the derivative of $r_{nT}$.

44. A mobile station according to claim 36, wherein the processing means is configured for deriving first and second speed estimates values from the first and second Doppler spreads respectively and selecting the first or second speed estimate value in dependent on the magnitude of the first or second speed estimate value to provide said speed estimate.

45. A mobile station according to claim 44, wherein the processing means is configured such that the first and second speed estimates are calculated in accordance with the formula:

$$\text{speed} \propto \frac{f_{d_{spread}}}{f_c}$$

where $f_{d\ spread}$ is the Doppler spread of the signal having the greatest energy during calculation of said respective derivatives and $f_c$ is the carrier frequency of said radio signal.

46. A mobile station according to claim 44, wherein the processing means is configured such that the first and second speed estimates are calculated as the mean of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

47. A mobile station according to claim 44, wherein the processing means is configured such that the first and second speed estimates are calculated as a weighted sum of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

48. A mobile station according to claim 44, wherein the processing means is configured such that the first and second speed estimates are calculated as the median of speeds calculated for a plurality of said signals in accordance with the formula:

$$\text{speed} \propto \frac{f_{d_{spread}}}{f_c}$$

where $f_{d\ spread}$ is the Doppler spread of a signal and $f_c$ is the carrier frequency of said signal.

* * * * *